United States Patent
Colban et al.

(10) Patent No.: US 7,346,352 B2
(45) Date of Patent: Mar. 18, 2008

(54) METHOD OF SYNCHRONIZING BROADCAST PARAMETERS TO SUPPORT AUTONOMOUS SOFT HANDOFF BY MOBILE STATIONS

(75) Inventors: Erik Colban, San Diego, CA (US); Srinivasan Balasubramanian, San Diego, CA (US); Irfan Khan, San Diego, CA (US)

(73) Assignee: Telefonaktiebolaget LM Ericsson (publ) (SE)

(*) Notice: Subject to any disclaimer, the term of this patent is extended or adjusted under 35 U.S.C. 154(b) by 231 days.

(21) Appl. No.: 10/982,152

(22) Filed: Nov. 4, 2004

(65) Prior Publication Data

US 2005/0096055 A1 May 5, 2005

Related U.S. Application Data

(60) Provisional application No. 60/611,489, filed on Sep. 20, 2004, provisional application No. 60/527,861, filed on Dec. 8, 2003, provisional application No. 60/517,739, filed on Nov. 5, 2003.

(51) Int. Cl.
*H04Q 7/20* (2006.01)

(52) U.S. Cl. ............... 455/442; 455/436; 455/437; 370/331; 370/332

(58) Field of Classification Search ........ 455/436–439, 455/442, 446, 452.2; 370/331–333
See application file for complete search history.

(56) References Cited

U.S. PATENT DOCUMENTS

| | | | |
|---|---|---|---|
| 5,946,612 A | * | 8/1999 | Johansson ............ 455/405 |
| 5,999,522 A | * | 12/1999 | Rohani ............ 370/331 |
| 6,002,678 A | | 12/1999 | Jayapalan et al. |
| 6,359,869 B1 | | 3/2002 | Sonetaka |
| 6,360,098 B1 | * | 3/2002 | Ganesh et al. ............ 455/436 |
| 6,396,814 B1 | * | 5/2002 | Iwamura et al. ............ 370/256 |
| 6,445,917 B1 | * | 9/2002 | Bark et al. ............ 455/423 |
| 6,574,475 B1 | * | 6/2003 | Suzuki ............ 455/438 |
| 6,731,936 B2 | * | 5/2004 | Chen et al. ............ 455/437 |
| 7,016,686 B2 | * | 3/2006 | Spaling et al. ............ 455/453 |
| 2002/0141360 A1 | | 10/2002 | Baba et al. |
| 2002/0142757 A1 | | 10/2002 | Leung et al. |
| 2003/0063591 A1 | | 4/2003 | Leung et al. |
| 2003/0078044 A1 | | 4/2003 | Leung |
| 2003/0114177 A1 | | 6/2003 | Sinnarajah |
| 2003/0134622 A1 | | 7/2003 | Hsu et al. |
| 2003/0145064 A1 | | 7/2003 | Hsu et al. |

FOREIGN PATENT DOCUMENTS

| | | |
|---|---|---|
| EP | 0 845 877 A | 4/2003 |
| EP | 1 326 462 A | 7/2003 |

* cited by examiner

*Primary Examiner*—CongVan Tran
(74) *Attorney, Agent, or Firm*—Coats & Bennett, P.L.L.C.

(57) ABSTRACT

A method of coordinating broadcast parameter settings enables autonomous soft handoff by a mobile station. Any base station can initiate a broadcast parameter coordination process. The initiating base station assumes the role of an arbitrator and is responsible for determining the broadcast parameters. The broadcast parameter coordination process does not require any intervention or involvement by the PDSN or any signaling with the mobile station, except to inform the mobile station of the soft handoff sectors after the broadcast parameter coordination process is completed. The list of soft handoff sectors may be sent to the mobile station in a common overhead message.

42 Claims, 11 Drawing Sheets

METHOD OF SYNCHRONIZING BROADCAST PARAMETERS TO SUPPORT AUTONOMOUS SOFT HANDOFF BY MOBILE STATIONS

RELATED APPLICATIONS

This application claims priority to Provisional U.S. Patent Applications 60/517,739 filed Nov. 5, 2003; 60/527,861 filed Dec. 8, 2003; and 60/611,489 filed Sep. 20, 2004, which are incorporated herein by reference.

BACKGROUND OF THE INVENTION

The present invention generally relates to broadcast and multicast services for wireless communication networks, and more particularly, autonomous soft hand-off by mobile stations between base stations while receiving a broadcast stream.

The 3rd Generation (3G) wireless communication networks provide mobile users wireless access to packet data networks, such as the Internet. Many Internet applications and services, once available only to users at fixed terminals, are now being made available via wireless communication networks to mobile users. Services such as real-time streaming video and music, and on-line interactive gaming, are just a few examples of services now being provided via wireless networks to mobile users. The demand for such services challenges standardization bodies to develop 3G standards capable of providing high rate data transmission over the radio interface between the access network and mobile users.

The broadcast/multicast service (BCMCS) provides the ability to transmit media content to multiple users simultaneously over a shared forward link channel. A BCMCS stream, referred to herein as a broadcast stream, is transmitted at a fixed rate and at a constant power. Mobile station handoff is performed autonomously by the mobile stations. To improve system performance, it is desirable to support autonomous soft handoff between sectors in a wireless communication network transmitting the same broadcast stream. Soft handoff of mobile stations receiving broadcast streams requires coordination of broadcast parameters between the serving base stations in each sector. Further, there needs to be a mechanism to notify the mobile station which sectors the mobile station may soft combine.

SUMMARY OF THE INVENTION

The present invention provides a method of coordinating broadcast parameters to facilitate autonomous soft handoff across BSC boundaries by a mobile station. One exemplary embodiment uses a peer-to-peer or distributed control approach to coordinate broadcast parameters. Using the peer-to-peer approach, any base station can initiate a broadcast parameter coordination process. The initiating base station assumes the role of an arbitrator for the broadcast parameter coordination process and determines the broadcast parameters. The broadcast parameter coordination process does not require any signaling with the mobile station, except to inform the mobile station of the soft handoff sectors after the broadcast parameter coordination process is completed. The list of soft handoff sectors may be sent to the mobile station in a common overhead message, such as the Broadcast Overhead message in cdma2000 HRPD systems or the Broadcast Service Parameters message in cdma2000 1× systems.

In one exemplary embodiment of the invention, a three-way handshake is employed to negotiate common broadcast parameters settings for a plurality of sectors. An initiating base station sends a Broadcast Parameter Coordination Request message to one or more neighbor base stations. The Broadcast Parameter Coordination Request message may include proposed broadcast parameters and/or a list of sectors that the initiating base station will commit to a soft handoff for a designated broadcast stream. The neighbor base station returns a Broadcast Parameter Coordination Response message. The Broadcast Parameter Coordination Response message may include indicating the sectors that the neighbor base stations will commit to the soft handoff and optionally alternate proposed broadcast parameters if the neighbor base station is unable to commit to the proposed broadcast parameter settings in the Broadcast Parameter Coordination Request message. The initiating base station determines the broadcast parameter settings and soft handoff sectors for the soft handoff based on the responses from the neighbor base stations and sends a Broadcast Parameter Commit message to the neighbor base stations including a negotiated set of common broadcast parameter settings and a list of the soft handoff sectors committed to the soft handoff. The soft handoff sector list may be transmitted to the mobile station by any one of the base stations in an overhead message, such as a Broadcast System Parameters message.

Another exemplary embodiment of the invention employs a master-servant or centralized control approach. With this approach, one base station is designated as the master base station for a group of base stations and is responsible for determining the common broadcast parameter settings. The master base station receives a Broadcast Parameter Coordination Request message from a base station in its group and returns a Broadcast Parameter Coordination Response containing the broadcast parameters and an action time when the broadcast parameters will be effective. The requesting base station sends a Broadcast Parameter Commit message indicating the sectors that it will commit to the soft handoff based on the broadcast parameters in the Broadcast Parameter Coordination Response. If the master base station changes the broadcast parameter settings, the master base station sends a Broadcast Parameter Coordination Request to each base station in its group. The group members return a Broadcast Parameter Commit message indicating the base stations that the group members will commit to the soft handoff.

DETAILED DESCRIPTION OF THE INVENTION

Figure 1:
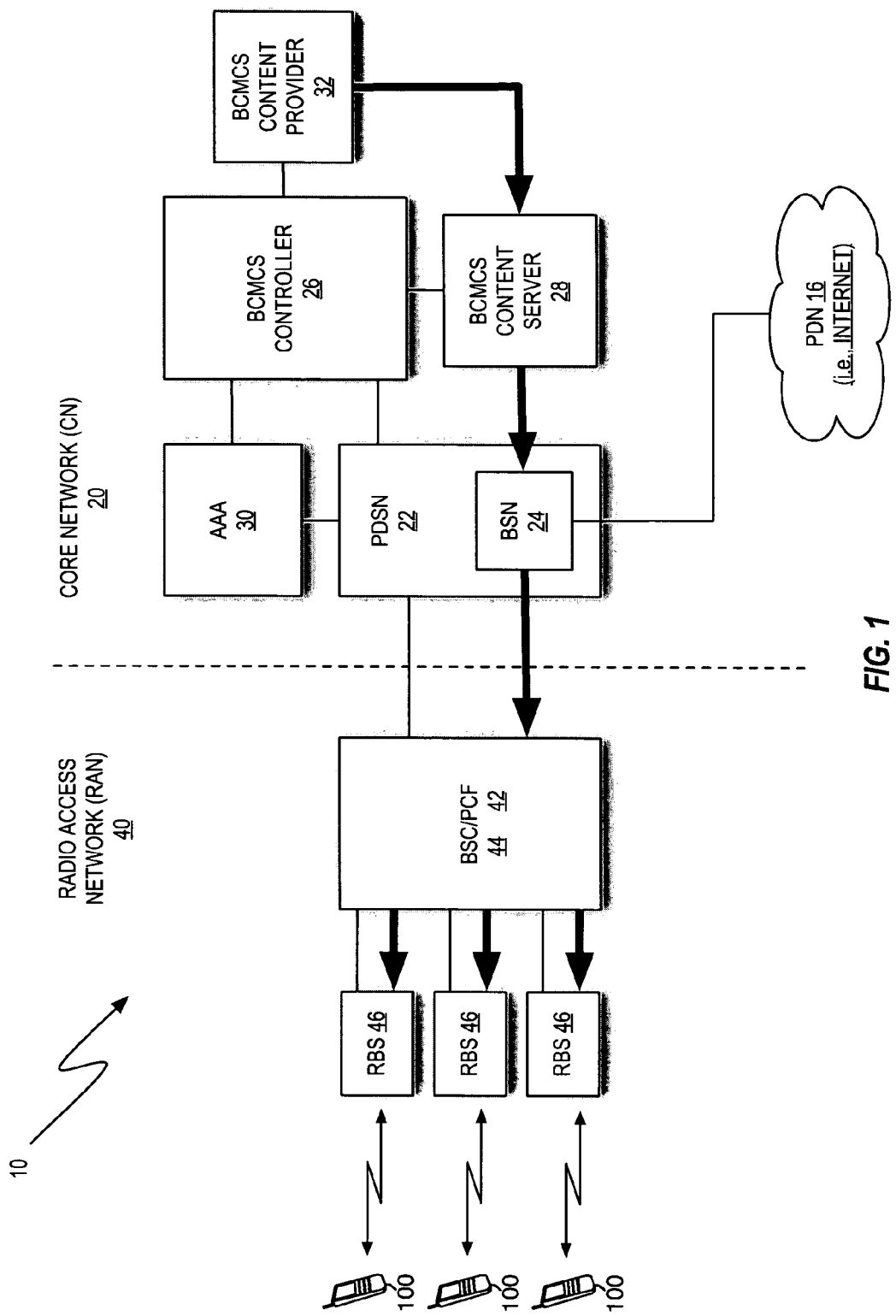
FIG. 1 is a diagram of a wireless communication network according to one exemplary embodiment based on cdma2000 standards

FIG. 1 illustrates logical entities of an exemplary wireless communication network 10 that provides broadcast/multicast services (BCMCS) to mobile station 100. The wireless communication network 10 may be any type of wireless communication network, such as a CDMA network, WCDMA network, GSM/GPRS network, EDGE network, or UMTS network. FIG. 1 illustrates a network 10 configured according to the cdma2000 standards. Wireless communication network 10 comprises a packet-switched core network 20 and a radio access network (RAN) 40. The core network 20 connects to one or more external packet data networks 16, such as the Internet, or to other wireless communication networks. The RAN 30 connects to the core network 20 and serves as the access point for mobile station 100.

The core network 20 includes a Packet Data Serving Node (PDSN) 22, a Broadcast Serving Node (BSN) 24, a BCMCS Controller 26, a BCMCS Content Server (BCMCS-CS) 28, and an authentication, authorization and accounting server (AM) 30. The core network 20 may further include a BCMCS Content Provider (BCMCS-CP) 32, however, those skilled in the art will understand that the BCMCS-CP 32 may reside outside of the core network 20.

The PDSN 22 connects to an external packet data network (PDN) 60, such as the Internet, and supports PPP connections to and from the mobile station 100. It adds and removes IP streams to and from the RAN 40 and routes packets between the external packet data network 16 and the RAN 40. The BSN 24, which may be incorporated into the PDSN 22, connects to the BCMCS-CS 28 and supports BCMCS streams to and from the mobile station 100. It adds and removes BCMCS streams to and from the RAN 30. The functions of the BSN 24 may be incorporated into the PDSN 22 if desired.

The BCMCS controller 26 is responsible for managing and providing BCMCS session information to the BSN 24, BCMCS-CS 28, RAN 40, and the mobile station 100. The BCMCS-CS 28 is the logical entity that makes BCMCS content available to mobile station 100. The BCMCS-CS 28 is not necessarily the source of the content but may receive the content from a content provider. It may store and forward content from the content provider, or may merge content from multiple content providers. If encryption is used, the BCMCS-CS 28 may encrypt the stream content. It may also reformat content for delivery to the mobile station 100.

The AAA 30 is responsible for authentication, authorization and accounting functions. It accesses a Subscriber Profile Database (not shown) to obtain information from a user's subscription profile, and may send the user subscription profile to the BCMC-CS 28.

The content provider 32 is the source of content carried by a BCMCS stream. The broadcast content may comprise a real-time broadcast or a stored broadcast program, e.g. video on demand. The BCMCS-CP 32 may be a server within the serving network, in a mobile station's home network, or in an external PDN such as the Internet. If the content provider 32 is outside the network, the content provider packetizes the broadcast content for delivery over the IP network to the BCMCS-CS 28 in the core network 20, which makes the content available to mobile station 100 within the wireless communication network 10.

The RAN 40 includes a Packet Control Function (PCF) 42, a Base Station Controller (BSC) 44 and one or more radio base stations (RBSs) 46. The primary function of the PCF 32 is to establish, maintain, and terminate connections to the PDSN 22. The BSCs 44 manage the radio resources within their respective coverage areas. The RBSs 36 communicate over the air interface with mobile station 100. An exemplary air interface specification for providing BCMCS services is described in the Third Generation Partnership Project 2 (3GPP2) specification titled *CDMA High Rate Broadcast-Multicast Packet Data Air Interface Specification*, Version 1.0 (February 2004)(the *BCMCS Air Interface Specification*), which is incorporated herein by reference. A BSC 44 can manage more than one RBSs 46. In cdma2000 networks, the BSC 44 and an RBS 46 comprises a base station 50 (FIG. 4), which is described in more detail below. In cdma2000 networks, a single BSC 44 may comprise part of multiple base stations 50. In other network architectures based on other standards, the network components comprising the base station 50 may be different but the overall functionality will be the same or similar.

BCMCS services provide the ability to transmit the same information stream, referred to herein as a BCMCS stream or broadcast stream, to multiple users simultaneously. A BCMCS stream is also referred to as a BCMCS flow. BCMCS services may be used for video streaming applications and to provide videoconferencing capabilities to mobile station 100. Typical video streaming applications include live broadcasts and video on demand (VOD). In FIG. 1, the content for a BCMCS stream is received by the BCMCS-CS 28 from the BCMCS-CP 32. A BCMCS stream flows from the BCMCS-CS 28 to a number of mobile stations 100, which may be in different sectors of the wireless communication network 10. The BCMCS stream is duplicated at branching points within the network 10 to make the stream available to different sectors. For example, the PCF 44 may divide the BCMCS stream for delivery to two or more BSCs 44, which may in turn divide the BCMCS stream for delivery to two or more RBSs 46. One or more RBSs 36 broadcast the BCMCS stream to the mobile station 100 over a forward broadcast channel. The BCH may comprise several subchannels referred to herein as Broadcast Logical Channels. A BCMCS stream is carried on one Broadcast Logical Channel. Each Broadcast Logical Channel may carry one or more BCMCS streams. In order for a mobile station 100 to discover and monitor broadcast content successfully, various broadcast-related parameters need to be sent to the mobile receiver over the air interface. The network broadcasts these parameters over the BCH in the form of a broadcast overhead message. The broadcast overhead message contains the logical-to-physical channel mapping and other parameters for each BCMCS stream to enable the mobile station 100 to successfully receive the BCMCS stream.

Though not essential to the invention, a description of the BCMCS service may be useful to understand the invention. Reception of a BCMCS service is enabled by a number of procedures that are described in the 3GPP2 specification titled *Broadcast and Multicast Services Framework X.P0019, Rev. 0.1.4* (Mar. 15, 2004)(*Framework*). The basic procedures include service discovery/announcement, content subscription, content information acquisition, content availability determination, BCMCS registration, reception of content, and BCMCS deregistration. The network 10 provides one or more mechanisms to enable users to request or be informed about BCMCS services available. The BCMCS-CS 28 may act as a server in communication with a client application in a mobile station 100. The client application may request BCMCS service information from the BCMCS-CS 28, or the BCMCS-CS 28 may send unsolicited announcements about BCMCS services. Other service discovery/announcement mechanisms include announcements via SMS and WAP. Whatever mechanism is used for service discovery/announcement, the information concerning BCMCS content and schedule is provided to the mobile station 100. The service discovery/announcement mechanism provides basic information about the service required for information acquisition, such as the content name and start time.

The user subscribes to BCMCS content and selects the content that he wants to receive. Content subscription may be performed either before or after service discovery/announcement. User subscription information is stored in a subscriber profile. To receive selected content, the mobile station 100 communicates with the BCMCS controller 26 to acquire session information associated with a selected BCMCS content. This process is known as content information acquisition. The session information includes such information such as a BCMCS flow Identifier that identifies a BCMCS stream, flow treatment, e.g., header compression and/or header removal, and the transport and application protocols used.

The content availability determination procedure enables the mobile station 100 to determine the availability of a particular BCMCS stream. The serving RBS 46 may transmit content availability information to the MS in overhead messages. If the mobile station 100 cannot find the content availability information from the overhead messages, the mobile station 100 may request the desired BCMCS stream by making a BCMCS registration request.

The mobile station 100 uses a BCMCS registration procedure to request delivery of a BCMCS stream. In cdma200 networks, the BCMCS registration request is sent by the mobile station 100 to the serving RBS 36 over the Random Access Channel (RACH) or Enhanced Random Access Channel (REACH). If a bearer path between the BCMCS-CS 28 and the RBS 46 is not established, the RBS 46 in cooperation with the BCMCS-CS 28 will establish a bearer path. Once the mobile station 100 begins receiving the BCMCS stream, the RBS 46 may require the mobile station 100 to periodically re-register. Periodic registration allows the RBS 46 to stop broadcasting a BCMCS stream when there are no mobile station 100 receiving the stream.

The mobile station 100 may perform a BCMCS deregistration procedure to notify the RBS 46 that the mobile station 100 is no longer monitoring the BCMCS stream. Deregistration may also occur via time out at the RBS 46 if the deregistration timer for the mobile station 100 expires.

The broadcast channel (BCH) for transmitting a BCMCS stream over the air interface may be a shared channel or a dedicated channel. The BCH, in general, will have a forward link but no reverse link. In cdma2000 systems, the broadcast channel may comprise one or more forward supplemental channels (F-SCH). Also, the BCH could be carried over a shared packet data channel, such as the forward packet data channel F-PDCH in cdma2000. The BCH carries packets containing the BCMCS content generated by the BCMCS-CS 28. The BCH can also carry forward-link signaling messages. Each BCMCS stream is associated with an identifier called a BCMCS Flow ID.

Figure 2:
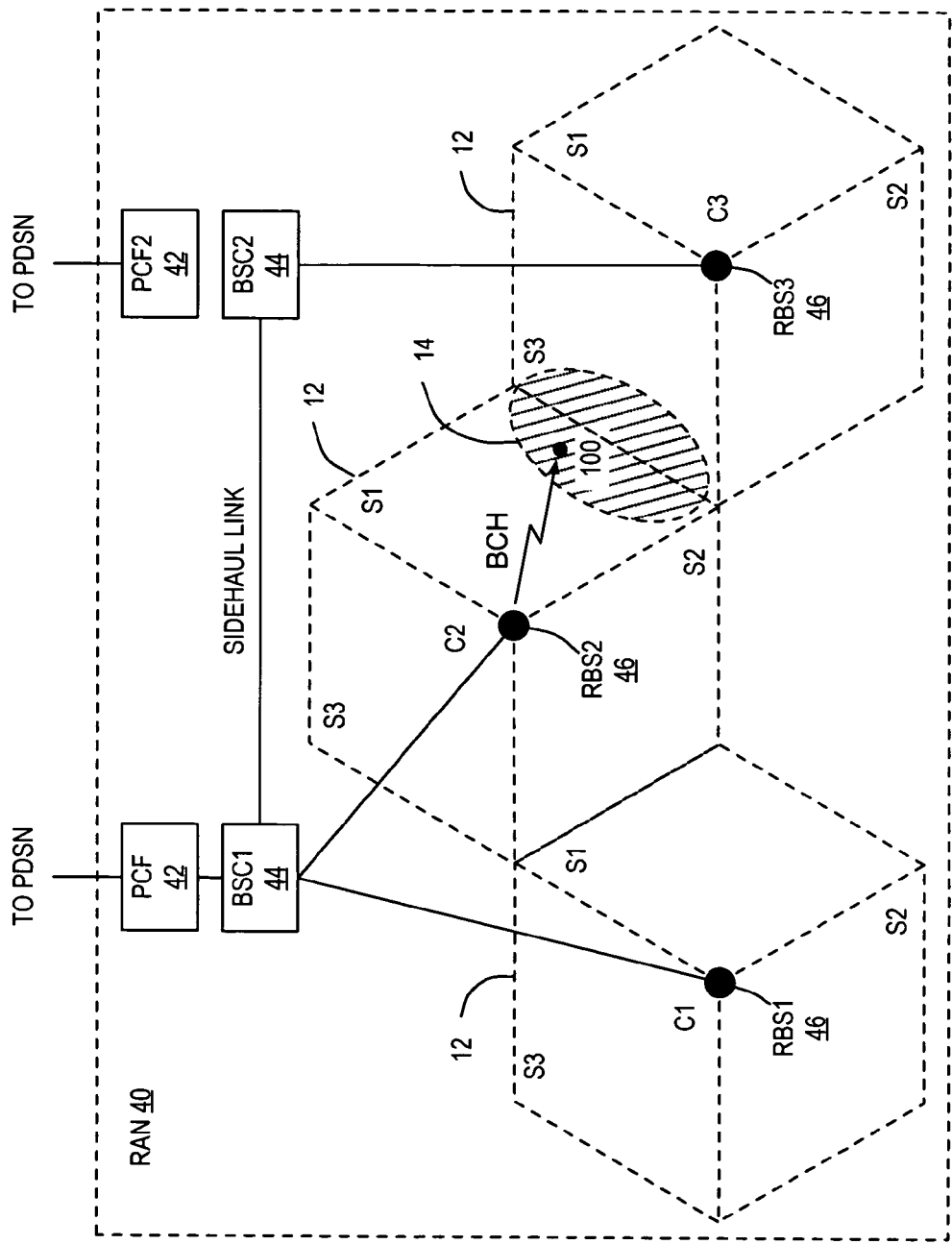
FIG. 2 is a diagram of a radio access network according to one embodiment of the present invention based on the cdma200 standards.

When a mobile station 100 receiving a broadcast stream from a cell or sector from an RBS 46 in the network 10 adds to its active set another cell or sector from another RBS 46 serving the same broadcast stream, the mobile station 100 performs an autonomous soft handoff. FIG. 2 illustrates mobile station 100 during handoff and provides further details of the RAN 30. FIG. 2 illustrates three RBSs 46, each providing coverage in a geographic region known as a cell 12. The cells 12 are represented as hexagonal regions and are denominated as cells C1, C2 and C3. Each cell 12 is divided into three sectors to reduce interference. The sectors in each cell 12 are denominated as sectors S1, S2 and S3. Two BSCs 44, denominated as BSC1 and BSC2 are illustrated. RBS1 and BSC1 comprise a first base station BS1 providing coverage in cell C1. RBS2 and BSC1 comprise a second base station BS2 providing coverage in cell C2. RBS3 and BSC2 comprise a third base station BS3 providing coverage in cell C3. BSC1 and BSC2 are connected by a sidehaul link, which is referred to in the IS-2001 standard as the A3/A7 interface. The A3interface carries user traffic between BSCs 44 and the A7 interface carries signaling between BSCs 44.

As shown in FIG. 2, a mobile station 100 in cell C2 has entered a boundary region 14 between sector S1 of cell C2 and sector S3 of cell C3. Prior to entering the boundary region, the mobile station 100 was receiving a broadcast stream from BS2. The network 10 must detect the mobile station 100 in the boundary region 14 and provide the same broadcast stream to BS3 to enable a handoff between BS2 to BS3. The network 10 may detect entry by the mobile station 100 into the boundary region 14 by monitoring signal quality reports from the mobile station 100. For example, when the mobile station 100 is in a boundary region 14, Periodic Pilot Strength Measurement Messages (PPSMMs), or the like, returned from the mobile station 100 will include pilot strength measurements for one or more neighboring base stations controlling the adjacent service areas associated with the boundary region 14. Thus, BS2 may detect that the received signal strength for its pilot is decreasing at the mobile station 100, while the received signal strength for BS3 is increasing. When the network 10 detects the mobile station 100 in the boundary region 14, it provides the broadcast stream to each adjacent base station 50 in anticipation of a handoff by the mobile station 100.

In a preferred embodiment of the invention, the mobile station 100 handoffs autonomously based on the pilot strength measurements from neighboring base stations and/or other channel quality statistics. To improve system performance, it is desirable to support soft handoff by a mobile station 100 receiving a broadcast stream to enable soft-combining at the mobile station 100. When the mobile station 100 moves between sectors served by the same base station, or between sectors in two different base stations served by the same BSC 44, conventional soft-handoff procedures can be used. It is also desirable to support soft handoff across BSC boundaries, which is referred to herein as an inter-BSC handoff.

The present invention provides procedures that can be implemented by the base stations 50 in network 10 to support autonomous soft handoff by a mobile station 100 across BSC boundaries. Soft handoff requires that the transmission of broadcast streams be coordinated between participating base stations 50. The BCMCS Flow ID is known to the PDSN 22, base stations 50, and mobile station 100 and can be used to coordinate the broadcast stream content and broadcast parameters. Some of the broadcast parameters that need to be coordinated include:

Encoding and Data Rate—The same content needs to be transmitted at the same rate the same application layer encoding needs to be used across the sectors in a soft handoff. It may be desirable to use more than one encoding/compression algorithm to adapt to the available bandwidth, which may vary over time.

Frequency—Each base station 50 needs to transmit the broadcast stream over the same frequency.

Long code mask—Each base station 50 needs to apply the same long code mask to the broadcast stream.

Framing—There are two framing methods available for BCMCS—framing at the PDSN/BSN using HDLC, and framing at the BSC 44 using the Broadcast Framing Protocol.

Flow level encryption—The base stations 50 must coordinate encryption. Possible encryption schemes include link level encryption, application level encryption, or both. The same encryption keys need to be used by each base station.

Link level encryption—Security parameters for link level encryption need to be the same, otherwise link level encryption should be disabled. The short-term key is generated from the BAK and a random seed. The BAK will be the same for all base stations 50. To enable encryption, the random seed needs to be exchanged. The base stations should use the same hash function for short key generation that yields the same short key in all base stations.

Reed Solomon Coding—In cdma2000, Reed Solomon (RS) outer coding is enabled only for rates 115200 bps. When enabled, the start of RS blocks for Reed Solomon coding need to be the same so that the transmission of the information bits and the computation of the parity bits are synchronized.

Time synchronization—The same data need to be transmitted from the same sectors at the same time during a soft handoff. Transmissions should be time synchronized on a frame by frame basis.

Frame Offset—Each base station 50 must use the same frame offset.

Power Offset—The mobile station 100 soft combines the packets based on the pilot power level it sees for the sectors. The pilot power level may be different for different sectors. For maximal ratio combining, the traffic to pilot ratio should preferably be the same for all sectors.

Neighbor list—The mobile station 100 needs to be informed of the possible set of sectors that can be soft combined through common channel messaging, e.g. the Broadcast Overhead message for IS 6001 (1×EV-DO) and the Broadcast Services Parameter message for IS-2001 (1×EV-DV). Base stations 50 participating in a soft handoff need to agree on the sectors that will transmit the broadcast stream, which may be a subset of the mobile station 100's active set.

Some of the broadcast parameters listed above may be fixed and others may be negotiable between participating base stations 50. Further, the above list of broadcast parameters is not intended to be limiting and those skilled in the art may find reasons to add other broadcast parameters in addition to or in place of those listed above.

In one exemplary embodiment of the invention, a peer-to-peer or distributed control approach is used to coordinate broadcast parameters. Using the peer-to-peer approach, each base station 50 includes a broadcast service function 64 (FIG. 4) that provides services necessary to support broadcast services, including coordinating broadcast parameters with its neighbors. The broadcast service function 64 at any base station 50 can initiate a broadcast parameter coordination process. The initiating base station 50 assumes the role of an arbitrator for the broadcast parameter coordination process. A three-way handshake described in more detail below is used to coordinate broadcast parameters without involvement or intervention by the PDSN 22. Further, broadcast parameter coordination process does not require any signaling with the mobile station 100, except to inform the mobile station 100 of the soft handoff sectors after the broadcast parameter coordination process is completed. The list of soft handoff sectors may be sent to the mobile station 100 in a common overhead message, such as the Broadcast Overhead message in 1×EV-DO systems or the Broadcast Service Parameters message in 1×EV-DV systems.

Figure 3:
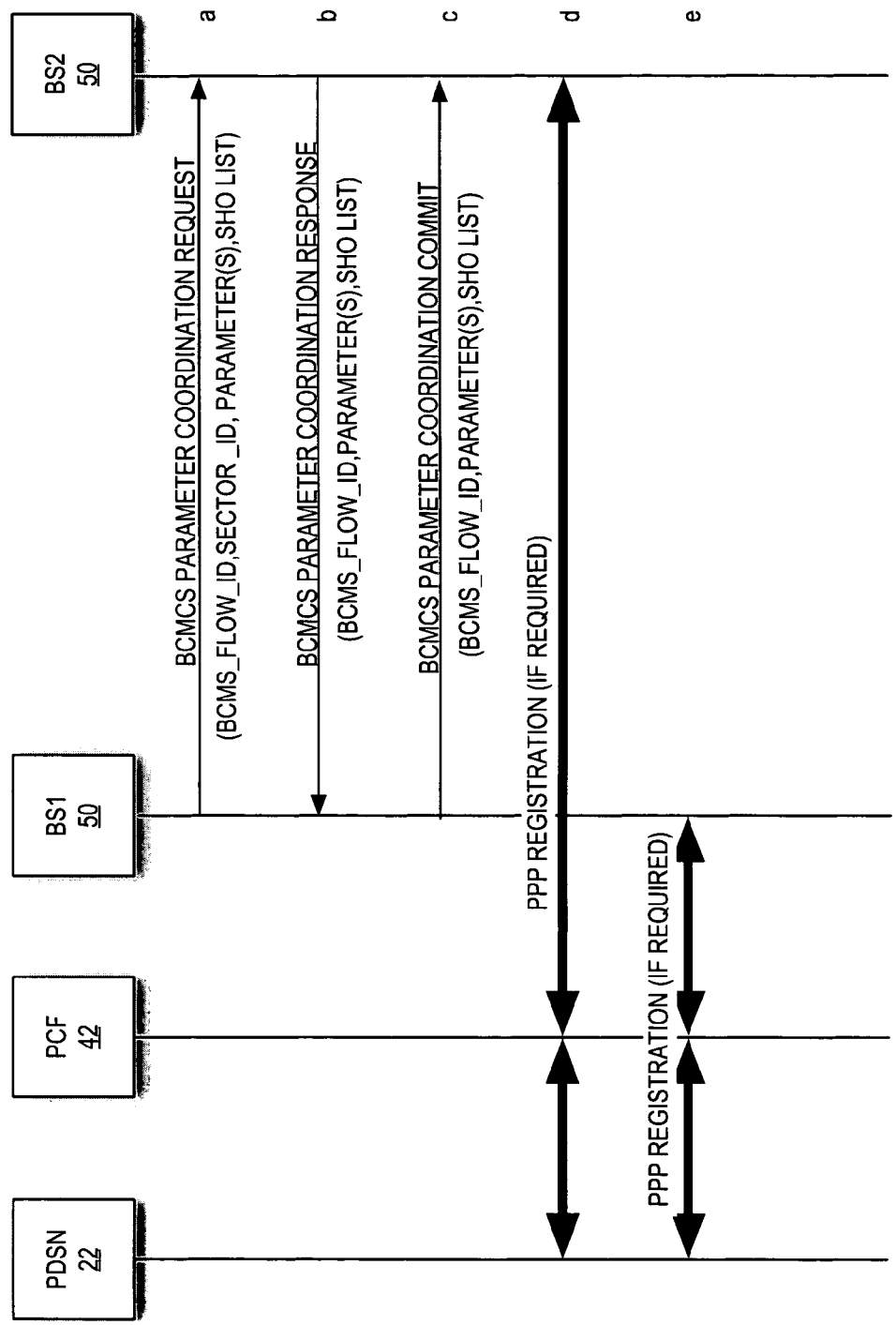
FIG. 3 is a call flow diagram illustrating a broadcast parameter coordination process according to one embodiment of the present invention based on distributed control.

FIG. 3 is a call flow diagram illustrating the broadcast parameter coordination process for an inter-BSC handoff according to one embodiment of the invention. In the example shown in FIG. 3, a mobile station 100 has moved into the boundary area 44 between sectors in two BSC coverage zones. In this example, the mobile station 100 has moved into boundary area adjacent BS1 and has sent a registration request message to BS1 that triggers the broadcast parameter coordination process. BS1 is the initiating base station 50 and serves as the arbitrator. BS1 sends a BCMCS Parameter Coordination Request to its neighbor base stations 50 (step a) represented in FIG. 3 by BS2. The BCMCS Parameter Coordination Request message includes the BCMCS Flow ID associated with the broadcast stream, and the sector ID for the sector that received the registration request. The BCMCS Parameter Coordination Request message may further include the broadcast parameter settings that it proposes to use, and a list of its own soft-handoff sectors that it will commit to a soft handoff for the identified broadcast stream. BS2 is one of the neighbor base stations to receive the BCMCS Parameter Coordination Request message. BS2 responds with a Broadcast Coordination Response message (step b). The BCMCS Parameter Coordination Response message includes the BCMCS Flow ID that identifies the broadcast stream. If the responding base station cannot use the broadcast parameters proposed by the requesting base station, it may include in the Broadcast Parameter Coordination Response an alternative set of the broadcast parameter settings that the answering base station 50 is willing to use on the border sectors. The Broadcast Parameter Coordination Response message includes a list of sectors in the control of the responding base station 50 that it will commit to the soft handoff. The Broadcast Parameter Coordination Response message could, in some embodiments, include an Action Time to indicate a time at which the broadcast parameters will be effective. After hearing from all of its neighbors, the initiating base station 50 determines what broadcast parameter settings to use and the sectors, including those controlled by neighbor base stations, that will use the same set of common broadcast parameter settings. The decision algorithm for determining the final broadcast parameter settings may depend on the objectives of the service provider. For example, if the primary objective of the service provider is to maximize soft combining, the initiating base station 50 may select a transmission rate that provides a maximal soft-handoff region. The initiating base station 50 sends a BCMCS Parameter Coordination Commit message to its neighbor base stations 50 indicating the final decision regarding the broadcast parameter settings that will be used and the sectors included in the soft handoff (step c). The Broadcast Parameter Commit may also include an Action Time that indicates a time when the broadcast parameters will be effective. If a neighbor base station 50 needs to do so, it establishes a connection with the PDSN 22 according to well-established and known procedures (step d). In some situations, the initiating base station 50 may need to change its transmission parameters. Such changes may require the initiating base station 50 to request a new connection with the PDSN 22 (step e).

Certain predetermined broadcast coordination events may trigger the base station 50 to initiate a broadcast parameter coordination process as described above. Possible triggers for broadcast parameter coordination include:

Receipt of a registration request from a mobile station 100.

A change of conditions that dictate a need to change the rate of a BCMCS transmission.

Start of a BCMCS session.

Periodically to correct for changes.

After a disruption in transmission to the mobile station 100.

Mobile station 100 detecting lack of synchronization and requesting the base stations 50 to re-synchronize. The mobile station 100 may detect lack of synchronization based on the number of frame erasures over a predetermined window. If the number of frame erasures exceeds a threshold, the mobile station 100 may request the base stations 50 to synchronize broadcast parameters.

When broadcast parameter coordination process is triggered, the base station 50 negotiates the broadcast parameters with its soft-handoff neighbors using the three-way handshake process as described above. At the completion of the handshake process, each base station 50 involved will know what broadcast parameters to use on which sectors, and will have a list of other soft handoff sectors that will use the same broadcast parameters. Each base station 50 can transmit the list of soft handoff sectors to the mobile station 100 in the Broadcast System Parameters message. The mobile station 100 can then determine which sectors to include in its active set when performing a soft handoff.

Figure 4:
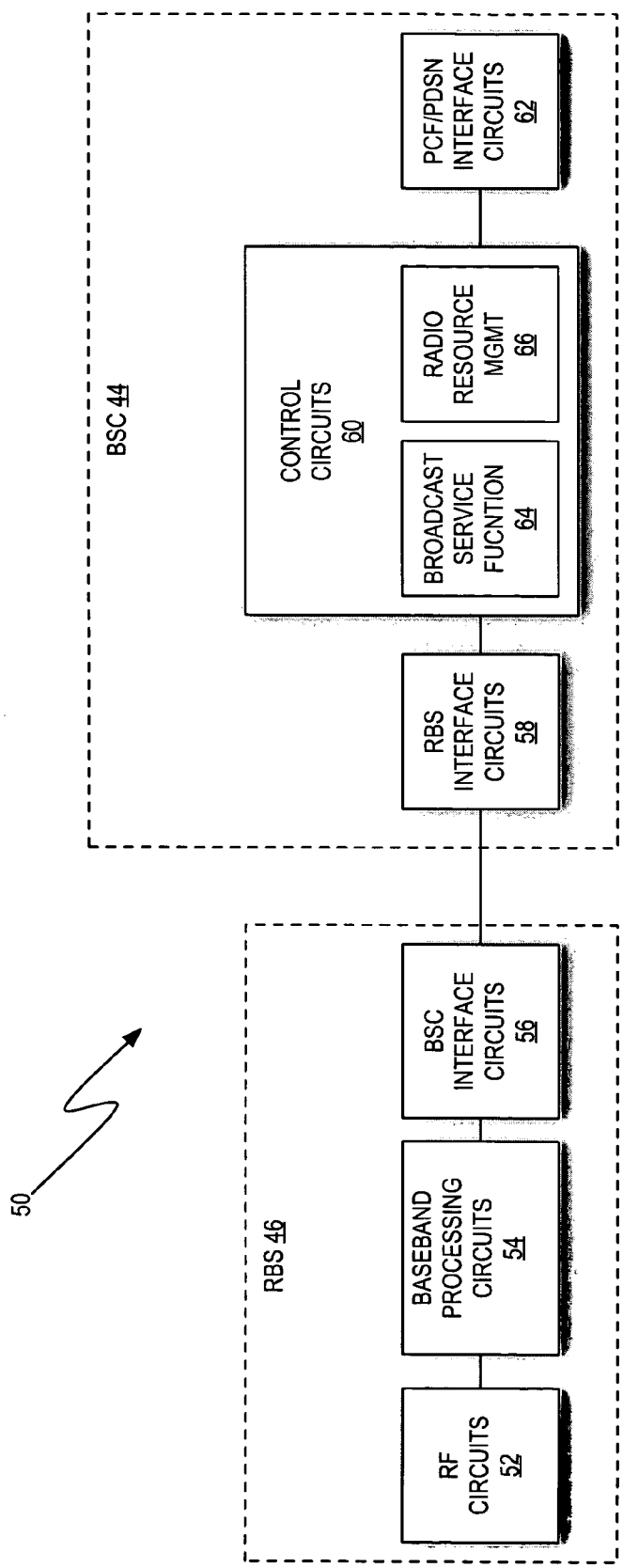
FIG. 4 is block diagram of an exemplary base station configured to implement the broadcast parameter coordination process shown in FIG. 3.

FIG. 4 illustrates an exemplary base station 50 configured to implement the broadcast parameter coordination process described above. The base station components in the exemplary embodiment are distributed between a RBS 46 and a BSC 44. The RBS 46 includes RF circuits 52, baseband processing circuits 54, and interface circuits 56 for communicating with the BSC 44. The BSC 44 includes interface circuits 58 for communicating with the RBS 46, communication control circuits 60, and interface circuits 62 for communicating with the PCF 42. The communication control circuits 60 include the broadcast service function 64 to perform processing tasks related to broadcast services, and radio resource management circuits 66 to manage the radio and communication resources used by the base station 50. The communication control circuits 60 may comprise one or more processors programmed to carry out the functions of the communication control circuits 60. The broadcast service function 64 receives GRE packets transmitted from the PDSN 22, de-packetizes the GRE packets, and formats the broadcast stream into frames for transmission over the air interface to one or more mobile stations 100. The broadcast service function 64 is also responsible for coordinating broadcast parameters with neighbor base stations 50 as previously described. The broadcast service function 64 may be implemented in a processor programmed to carry out the functions of the BSF 64.

Figure 5:
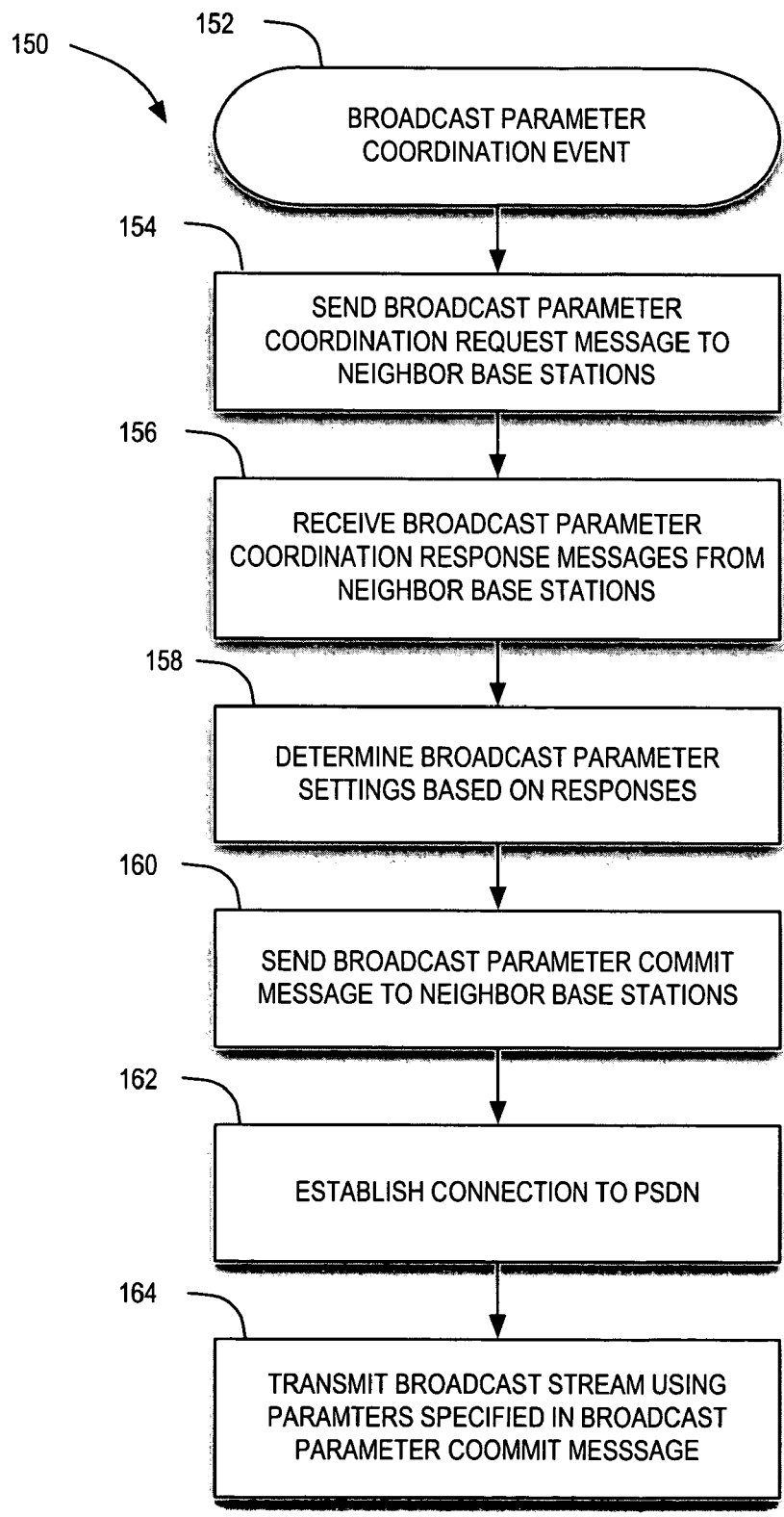
FIG. 5 is a flow diagram illustrating an exemplary program executed by a base station initiating the broadcast parameter coordination process as shown in FIG. 3.

FIG. 5 is a flow diagram illustrating an exemplary program 150 executed by a broadcast control function 64 at the base station 50 initiating the broadcast parameter coordination process as shown in FIG. 3. The procedure starts when a broadcast parameter coordination event occurs (block 152). The base station 50 sends a Broadcast Parameter Coordination Request message to its neighbor base stations, which may be preconfigured (block 154), and waits a predetermined time period for responses from the neighbor base stations 50. After receiving a Broadcast Parameter Coordination Response message from each of its neighbors, or after a predetermined period of time has elapsed, the initiating base station 50 determines the broadcast parameter settings for the soft handoff and the soft handoff sectors (block 158). The initiating base station 50 then sends a Broadcast Parameter Commit message to its neighbor base stations 50 indicating the negotiated broadcast parameters and the sectors committed to the soft handoff (block 160). If necessary, the base station 50 establishes a connection to the PDSN 22, if not yet established, to receive the broadcast stream (block 162). The base station 50 transmits the broadcast stream in the sectors included in the soft handoff list using the broadcast parameter settings specified in the Broadcast Parameter Commit message. (block 164).

Figure 6:
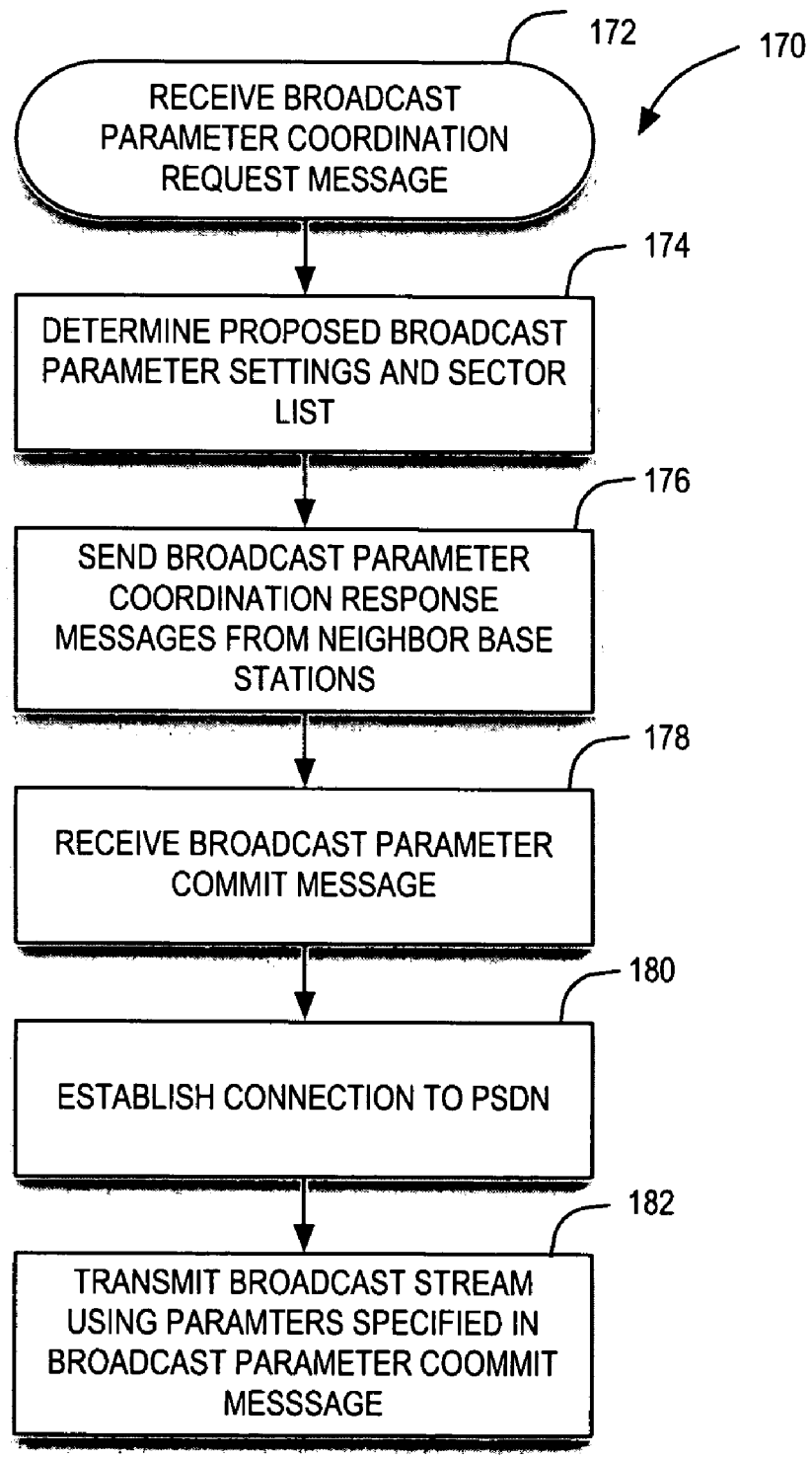
FIG. 6 is a flow diagram illustrating an exemplary program executed by a base station responding to a Broadcast Parameter Coordination Request as shown in FIG. 3.

FIG. 6 is a flow diagram illustrating an exemplary program 170 executed by the broadcast service function 66 at a base station 50 responding to a Broadcast Parameter Coordination Request as shown in FIG. 3. The base station 50 receives a Broadcast Parameter Coordination Request from a neighbor base station 50 (step 172). The base station 50 determines proposed broadcast parameters settings and available sectors (block 174) and returns a Broadcast Parameter Coordination Response message (block 176). The base station then waits for a Broadcast Parameter Commit message from the initiating base station 50. When the broadcast parameter coordination commit message is received (block 178), the base station 50 establishes a connection to the PDSN 22, if not yet established, to receive the broadcast stream (block 180), and transmits the broadcast stream in the committed sectors using the broadcast parameter settings specified in the Broadcast Parameter Commit message (block 182).

In an alternate embodiment of the invention, a master-servant or centralized approach may be used for broadcast parameter coordination. The master-servant or centralized control approach assigns each sector to a maximal soft-handoff region (MSHOR) and designates one base station 50 in the MSHOR to the master base station 50. A sector can only belong to one MSHOR. The master base station 50 for the MSHOR determines the broadcast parameters based on reports from the other base stations 50 in the MSHOR. The master base station 50 may use a three-way handshake process similar to the peer-to-peer approach to arbitrate the broadcast parameter coordination process. Sectors within the MSHOR may be dynamically added and removed. For example, a base station 50 in the MSHOR may commit one of its sectors to a soft handoff when a mobile station 100 registers in one of its sectors or when a particular broadcast program begins. The base station 50 may remove the one of its sectors from the soft handoff controlled by the master base station 50 when the sector can no longer support the rate or other parameters set by the master base station 50, or when there are no users in the sector receiving a particular broadcast stream. Intra-BSC handoffs are still possible between sectors that are not added to the soft handoff by the master base station 50.

Figure 7:
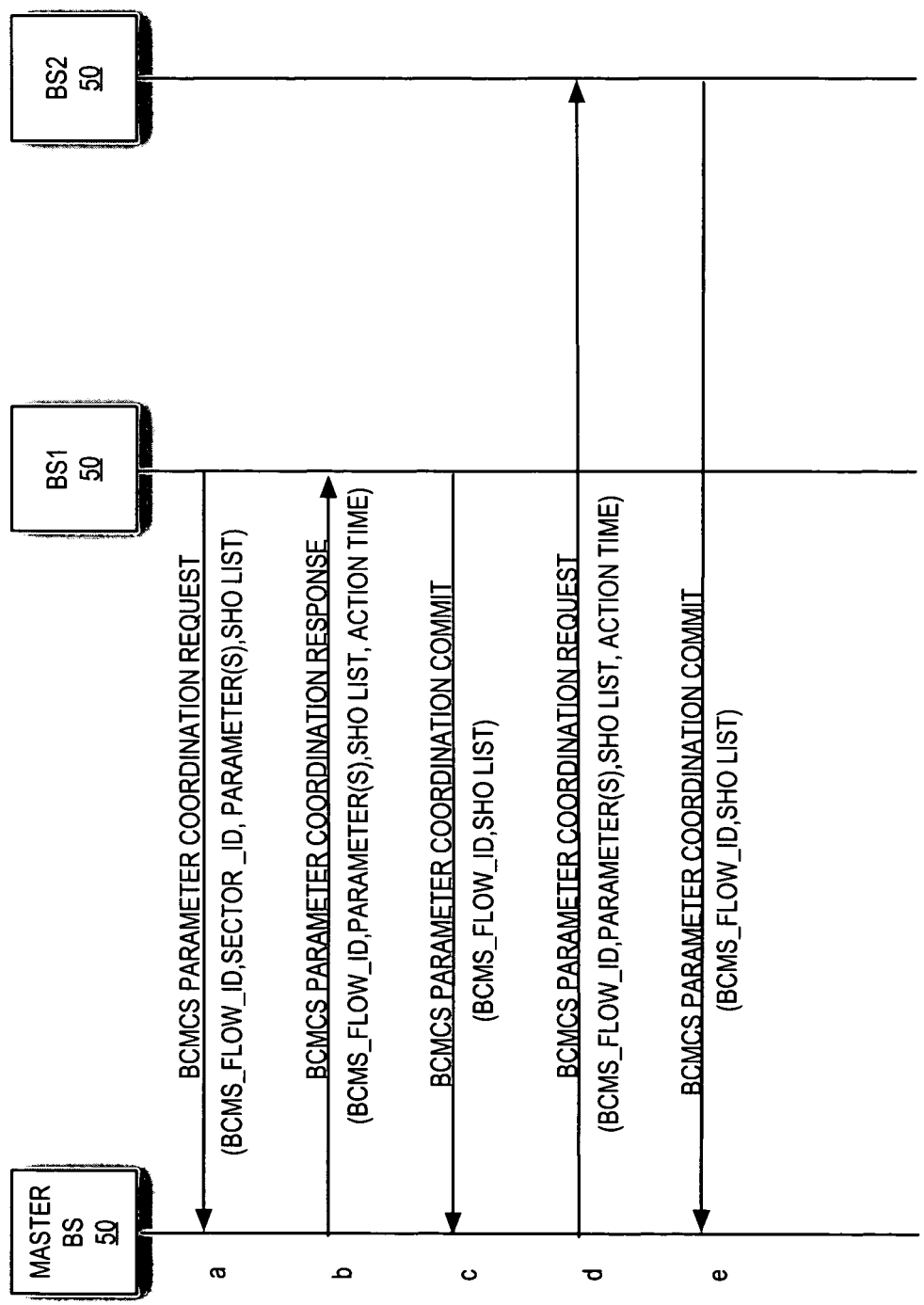
FIG. 7 is a call flow diagram illustrating an alternative broadcast parameter coordination process according to one embodiment using centralized control.

FIG. 7 is a call flow diagram illustrating the broadcast parameter coordination process for an inter-BSC handoff according to another embodiment of the invention. The call flow diagram illustrates three base stations 50 designated as the master base station, BS1, and BS2. In the example shown in FIG. 7, a mobile station 100 has moved into a boundary area 44 for a sector in the coverage area of BS1 and has sent a registration request message to BS1 that triggers the broadcast parameter coordination process. BS1 sends a BCMCS Parameter Coordination Request message to the master base station (step a). The BCMCS Parameter Coordination Request message includes the BCMCS Flow ID associated with the broadcast stream, the sector ID for the sector that received the registration request, proposed broadcast parameter settings that it desires to use, and a list of its own soft-handoff sectors that it will commit to a soft handoff. The master base station 50 knows the broadcast parameters currently associated with the broadcast stream. If necessary, the master base station 50 can change the broadcast parameter settings responsive to the Broadcast Parameter Coordination Request from BS1, or may decide to continue using the current broadcast parameter settings. The master base station 50 responds with a Broadcast Coordination Response message (step b). The BCMCS Parameter Coordination Response message includes the BCMCS Flow ID that identifies the broadcast stream, the broadcast parameter settings for the broadcast stream, a list of soft handoff sectors transmitting the broadcast stream, and an action time parameter that indicates when to start applying the broadcast parameter settings. The initiating base station, BS1, sends a BCMCS Parameter Coordination Commit message to the master base station 50 indicating the sectors that it will commit to the soft handoff based on the broadcast parameters specified in the Broadcast Parameter Coordination Response message (step c). If necessary, the master base station 50 then sends a Broadcast Parameter Coordination Request message to each base station 50 in the MSHOR (step d). This step may be necessary, for example, where the master base station 50 has changed the broadcast parameter settings. The Broadcast Parameter Coordination Request message includes the Broadcast Flow ID, the broadcast parameter settings, a SHO list, and an action time indicating when the new broadcast parameter settings will be effective. Each base station 50 receiving the Broadcast Parameter Coordination Request message from the master base station returns a Broadcast Parameter Coordination Commit message that includes the BCMCS Flow ID and the sectors that it can commit to the soft handoff based on the new broadcast parameter settings specified in the Broadcast Parameter Coordination Request message (step e).

Figure 8:
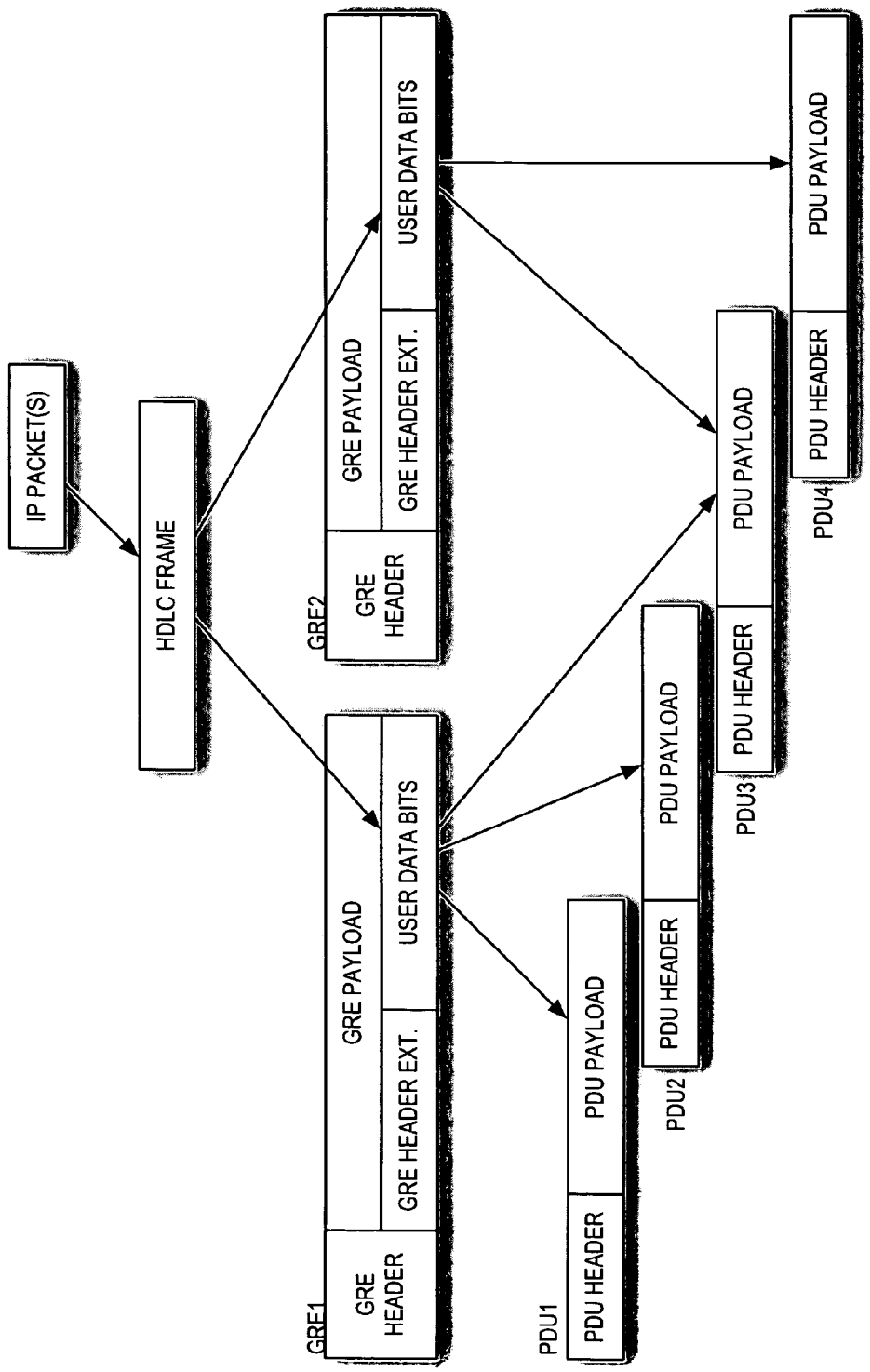
FIG. 8 is diagram illustrating an exemplary method of packetizing a broadcast stream.

FIG. 8 illustrates one exemplary method of packetizing a broadcast stream for delivery to mobile station 100. IP packets are transmitted to the PDSN 22 from the BCMCS-CS 28. A framing function in the PPP layer at the PDSN22 frames the IP packets to generate HDLC frames. Those skilled in the art will recognize that HDLC framing is not required and that framing at the BSC according to the Broadcast Framing Protocol may be used in place of or in addition to HDLC framing at the PDSN 22.

The PDSN 22 segments the HDLC frames into multiple segments that are inserted into GRE frames for transmission to the BSC 44 via the A8/A10 interface. The GRE frames include a GRE header and GRE payload. The GRE payload carries the HDLC frames or frame segments and is divided into octets. In a preferred embodiment, the GRE payload includes a header extension that includes a time stamp, sequence number or other synchronizing information. The presence of the header extension may be indicated by the Protocol Type field in the GRE header or in A11 Registration Request/Reply messages when setting up the A10 connection. The BSC 44 uses the time-stamp or sequence number contained in the GRE header extension to determine the time for transmitting the PDUs over the air interface to the mobile station 100. The time stamp indicates the time that the PDU containing the first octet of a GRE packet is transmitted over the A8/A10 interface to the PDSN 22.

The BSC 44 decapsulates the GRE packets and maps the GRE payload, less the GRE header extension, to Packet Data Units (PDUs) for transmission over the air interface to the mobile station 100. Data from two or more GRE packets may be mapped to a single PDU. Those skilled in the art will understand that the first octet of a GRE packet may not necessarily be located at the start of a PDU. In some embodiments of the invention, the PDU containing the last octet of a GRE packet may be padded with dummy bits or fill bits so that the first octet in every GRE packet coincides with the start of a PDU. In the embodiment shown in FIG. 6, however, the BSC 44 begins filling the remainder of the PDU with data from the next GRE packet when the last octet of the GRE packet is reached. As seen in FIG. 6, the first GRE packet fills the first two PDUs and part of the third PDU. Bits from the second GRE packet are used to fill the remainder of the third PDU. The fourth and fifth PDUs contain user data bits from the second GRE packet. Each PDU comprises a broadcast frame for transmission to the mobile station 100 over the air interface.

Figure 9:
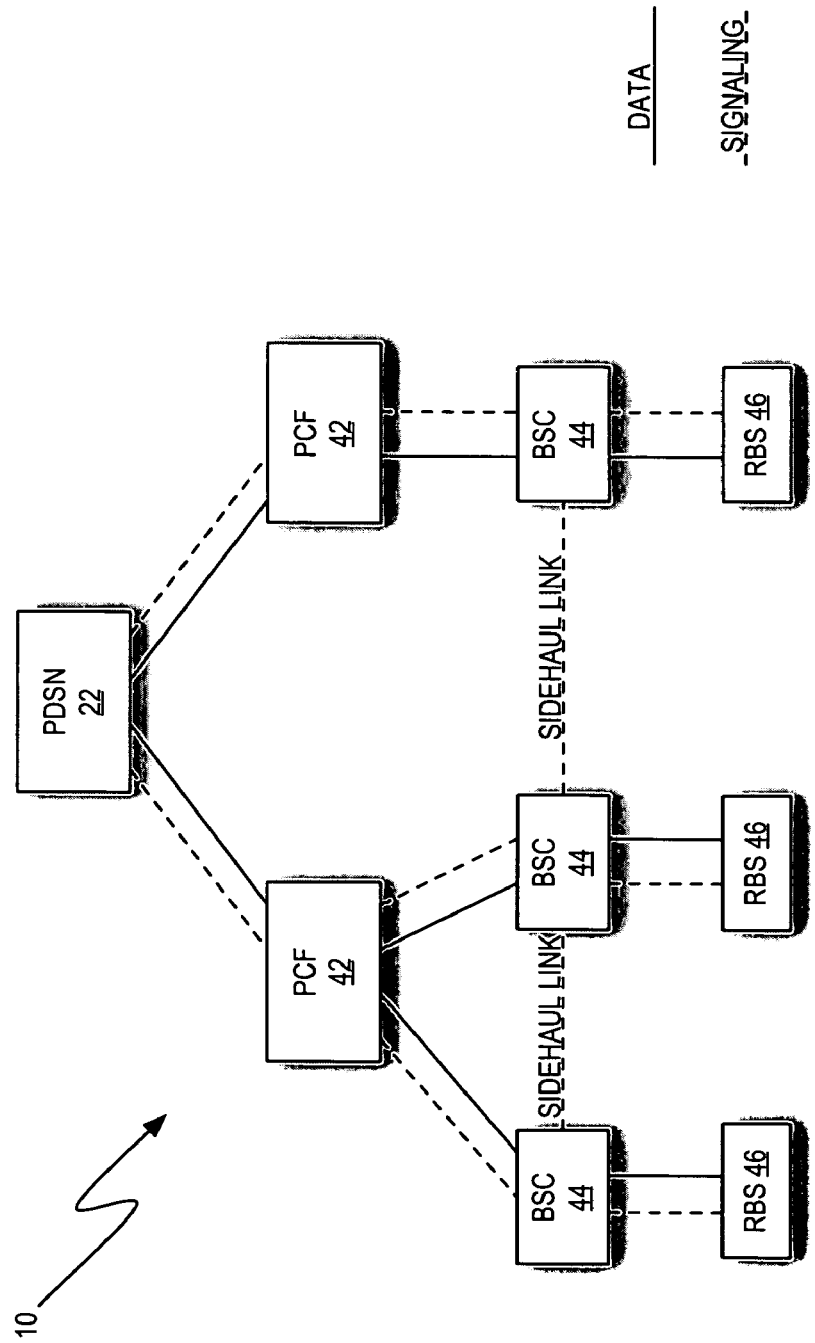
FIG. 9 is a block diagram illustrating the data and signal paths for the broadcast stream and related signaling respectively according to one embodiment of the present invention.

FIG. 9 illustrates the data and signaling paths in one exemplary embodiment of the invention that is particularly suited for the distributed control approach for coordination of the broadcast stream. The solid line in FIG. 9 represents the path of the broadcast stream, while the dotted line represents the signaling path for broadcast stream related signaling. In the embodiment shown in FIG. 9, each base station 50 receives the same broadcast stream from the PDSN 22. The sidehaul links between BSCs 44 are used for inter-BSC signaling. In cdma200 networks, the A7 interface comprises the sidehaul link used for inter-BSC signaling. One advantage of this approach is that no sidehaul links are needed to transport user data between BSCs 44. However, some mechanism is needed to synchronize transmission of broadcast frames over the air to the mobile station 100. The broadcast parameter coordination process described above can be used to coordinate the transmission of broadcast streams in different sectors. As noted earlier, the PDSN 22 may insert time synchronization information into the GRE packets delivered to the BSCs 44, which the BSCs 44 can use along with additional time synchronization parameters exchanged over the sidehaul link to time synchronize the broadcast streams. An exemplary method of time synchronization is described below.

Figure 10:
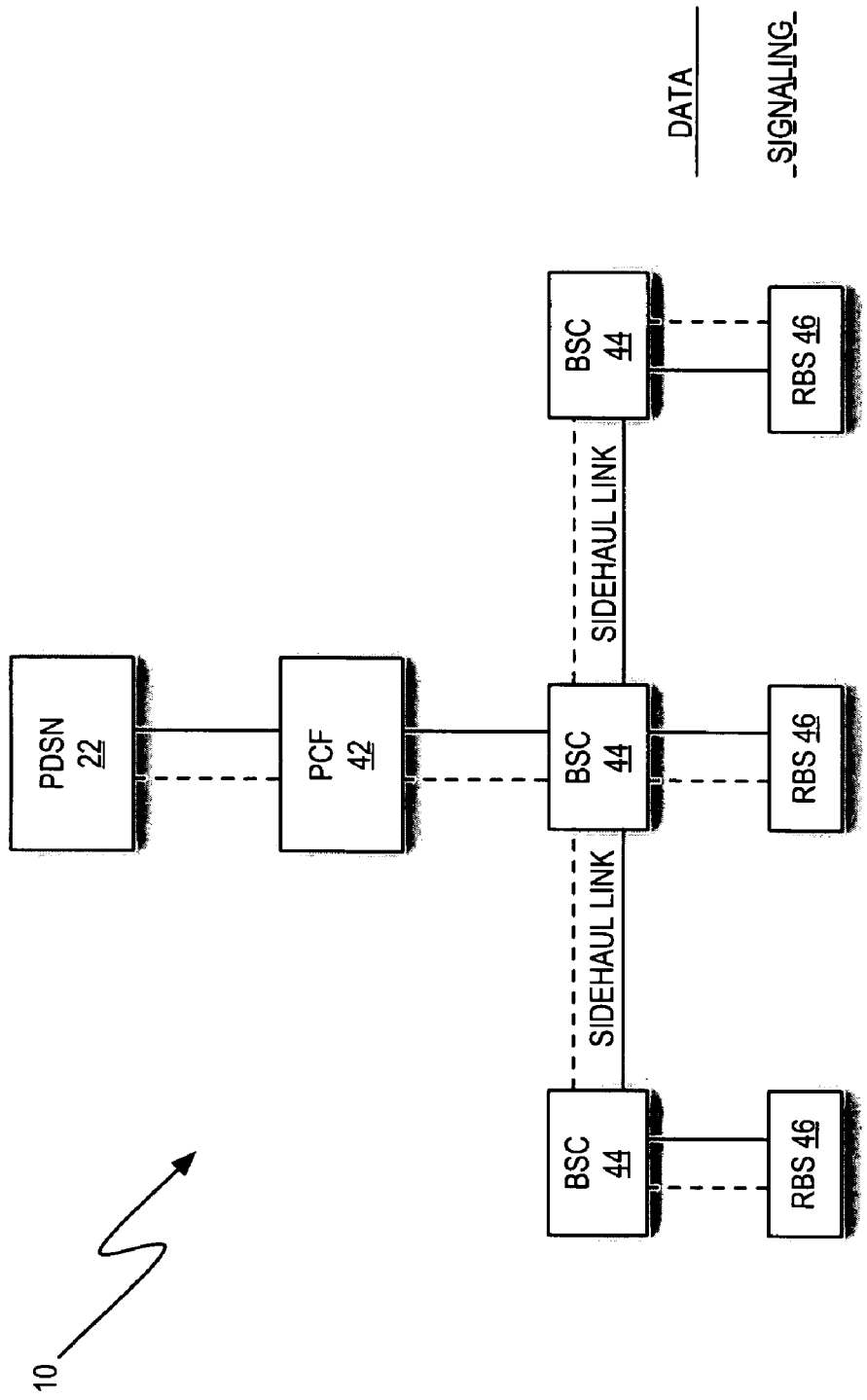
FIG. 10 is a block diagram illustrating the data and signal paths for the broadcast stream and related signaling respectively according to an alternative embodiment of the present invention.

FIG. 10 illustrates the data and signaling paths in another exemplary embodiment of the invention. In the embodiment shown in FIG. 10, a source base station 50 receives the broadcast stream from the PDSN 22 and is responsible for generating broadcast frames for transmission over the air interface for a particular broadcast stream. During soft handoff, the source base station 50 transmits the broadcast stream over a sidehaul link to the other base stations 50. When a base station 50 other than the source base station 50 receives a registration request from a mobile station 100, the base station 50 requests the content stream from the source base station 50 and receives the broadcast stream over a sidehaul link.

Figure 11:
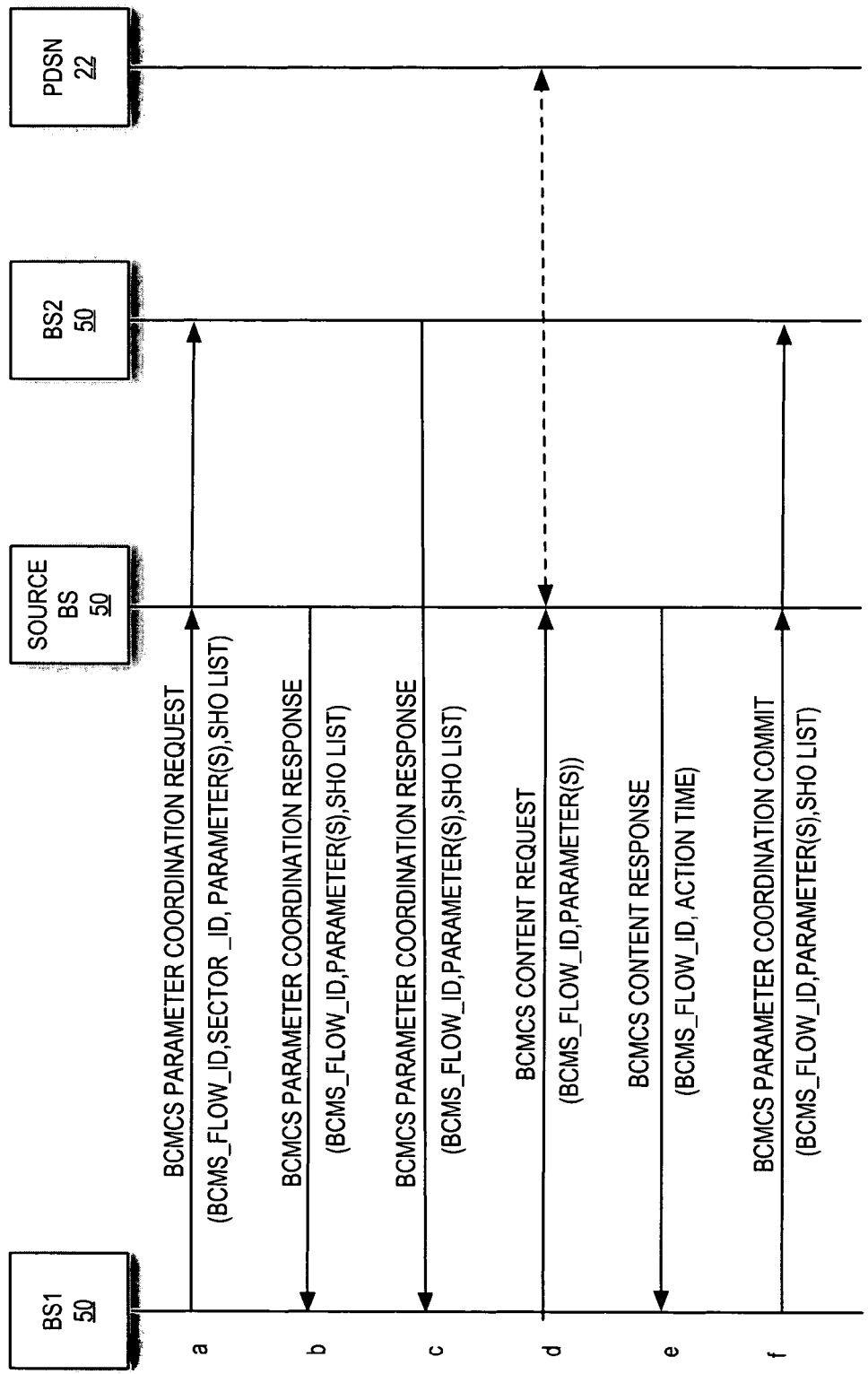
FIG. 11 is a call flow diagram illustrating an alternative broadcast parameter coordination procedure according to one embodiment of the present invention.

FIG. 11 is call flow diagram illustrating an exemplary procedure used by a base station 50 to request a broadcast stream from a source base station 50. A requesting base station, upon receiving a registration request from the mobile station 100, sends a BCMCS Parameter Coordination Request to all neighbor base stations 50 including the source base station (step a) and receives a BCMCS Parameter Coordination Response from each neighbor base station (steps b and c) as previously described and shown in FIG. 3. Based on the responses from the neighbor base stations 50, the requesting base station 50 determines the broadcast parameter settings to use and the soft handoff sectors as previously described. The registration request from the mobile station 100 identifies the source base station 50. The requesting base station 50 then sends a BCMCS Content Request message to the source base station 50 to request the broadcast stream (step d). The BCMCS Content Request message includes the BCMCS Flow ID for the broadcast stream and the broadcast parameter settings. The source base station 50 returns a BCMCS Content Response message to the requesting base station 50 (step e). The BCMCS Content Response message includes the BCMCS Flow ID and an Action Time parameter. The Action Time parameter indicates to the requesting base station 50 the time that the source base station 50 will begin transmitting the broadcast stream to the requesting base station 50 over the sidehaul link. If the source base station 50 does not have the broadcast content with the parameter settings specified in the BCMCS Content Request, the source base station 50 requests the content with the correct broadcast parameter settings from the PDSN 22. The requesting base station 50 then sends a BCMCS Broadcast Parameter Commit to the neighbor base stations 50 including the source base station 50 (step f).

In embodiments where all of the base stations 50 connect to the same PDSN 22 or BSN 24, a time-stamp approach may be used to synchronize transmission of broadcast frames across BSC boundaries. An exemplary time-stamping method will be described using FIG. 8 as a reference. At the start of a BCMCS transmission, the base station 50 calculates a time to begin the transmission of the broadcast stream based on the time stamp in the first GRE packet and a time offset $T_{offset}$ that indicates a desired packet latency. The time offset may be preconfigured or may be negotiated as part of the broadcast parameter negotiation process described earlier. The time stamp may be inserted into the GRE packet by the PDSN 22 or BSN 24. The time stamp may indicate the time that the GRE packet is transmitted by the PDSN 22 of BSN 24, or a time derived from the packet transmission time. Alternatively, the time stamp in the GRE packet may be derived from a time stamp in RTP packets received at the PDSN 22 or BSN 24 from the content server 28.

The base station 50 computes the start transmission start time TBS(i,s) of the first broadcast frame contains a part of GRE packet GRE(i) in sector s according to:

$$TBS(i,s)=TCN(i)+T_{offset} \quad \text{Eq. (1)}$$

where i is the sequence number of the GRE packet, TCN(i) is the time that the PDSN 22 transmits the GRE packet on the A8/A10 interface or other time stamp value, and $T_{offset}$ is the time offset. If the computed value of TBS(i, s) is not a possible frame start time, then TBS(i,s) is rounded up to the next frame transmission start time. Equation 1 may also be used to resynchronize after a disruption in transmission, or in response to a request from a mobile station to resynchronize.

For a subsequent GRE packet denominated as GRE(j) where j>i, the BSC 44 can compute the frame transmission start time TBS(j,s) for the frame containing the first bit of GRE(j) according to:

$$TBS(j,s) = TBS(i,s) + \left\lfloor \frac{P(i,s) + \sum_{k=i}^{j-1} N(k)}{S} \right\rfloor \times \Delta t \quad \text{Eq. (2)}$$

where TBS(i,s) is the frame transmission start time for the first broadcast frame containing a part of GRE(i), TBS(j,s) is the frame transmission start time for the first broadcast frame containing a part of GRE(j), P(i,s) is the position of the first bit of GRE(i) in the initial frame, N(k) is the number of user data bits in GRE packet with sequence number k, S is the number of user data bits in a broadcast frame, and Δt is the broadcast frame transmission time. The summation in Equation 2 gives the total number of user data bits in all previous GRE packets beginning with GRE(i) through GRE (j-1). The variable P(i,s) accounts for the bits in the frame preceding the first user data bit of GRE(i). The total bits transmitted is divided by the number of bits in a frame S to get the number of frames transmitted, which is rounded down to the nearest integer value. The number of broadcast frames is multiplied by the frame transmission time to get the total transmission time of each complete frame, ignoring the user data bits in GRE(j) carried over to the last frame. The total transmission time is added to the frame transmission start time TBS(i,s) of the first frame containing a part of GRE(i) to get the frame transmission start time TBS(j,s) of the first frame containing the a part of GRE(j).

The start position $P(i_n,s)$ of the first bit in $GRE(i_n)$ can be computed according to:

$$P(j,s) = \left( P(i,s) + \sum_{k=i}^{j-1} N(k) \right) \bmod S \quad \text{Eq. (3)}$$

Equation 3 computes the sum modulus S of the user data bits transmitted in all frames preceding GRE(j) beginning with the initial frame of GRE(i). This total includes the bits preceding the first bit of GRE(i) in the initial frame.

When a first base station 50 starts sending a broadcast stream in a sector s that is already being transmitted by a second base station 50 in a neighboring sector s', the first base station 50, denoted BS1, may send a request to the second base station 50, denoted BS2, for the frame transmission start time TBS(i,s') and start position P(i,s') for the GRE frame GRE(i) currently being transmitted. While the first base station BS1 is waiting for a reply, it may keep count of the number of user data bits in each transmitted GRE packet so that it calculate the frame transmission start time for a frame TBS(j,s) and start position P(j,s) to synchronize transmission in sector s' with the transmission sector s. That is, the base station BS1 will compute $$\sum_{k=i}^{j} N(k)$$

while it waits for the for BS2 to report the frame transmission start time TBS(i,s') and the start position P(i,s'). BS1 then sets TBS(j,s)=TBS(j,s') and P(j,s)=P(j,s'). The Broadcast Parameter Coordination process shown in FIG. 3 may be used to exchange time synchronization parameters.

If the base stations 50 insert signaling into the broadcast channel that delays the transmission of user data received from the PDSN, a similar calculation can be applied provided that the delay is equal at all base stations 50 transmitting the broadcast stream to the mobile station 100. For signaling messages that are not sent in all sectors, sectors can be removed from the soft handoff using the broadcast parameter coordination procedure previously described, and then added back to the soft handoff are the signaling is completed.

Due to the insertion of signaling messages into the broadcast stream and variances at which the PDSN 22 sends user data to the base stations 50, the latency period between the time that the PDSN 22 sends the user data and the time that the user data is actually transmitted to the mobile station 100 may vary. Such variances will in turn cause the buffer levels at the base stations 50 to increase and decrease as the packet latency varies. If the average rate at which the PDSN 22 sends user data to the base stations 50 exceeds the average rate at which the base stations 50 transmit the data to the mobile station 100, the fill level of the buffer will increase and could cause a buffer overflow. Conversely, if the average rate at which the PDSN sends user data to the base stations 50 is less than the average rate at which the base stations 50 send the user data to the mobile station 100, the buffer level will decrease and could cause the buffer to empty, i.e. buffer underflow. To prevent buffer overflow/underflow, upper and lower bounds can be set for the buffer level that trigger automatic resynchronization. The upper and lower bounds may be preconfigured by the network operator or may be negotiated between the base stations 50 during the broadcast parameter coordination process previously described.

In one embodiment of the invention packet latency L is computed by calculating the elapsed time between the time that the PDSN 22 transmits a GRE packet to the base station 50 and the frame transmission start time for the initial broadcast frame containing a part of the GRE packet. The time that the PDSN 22 transmits the GRE packet is identified by the time stamp TCN(i) in the GRE packet. The frame transmission start time TBS(i,s) may be computed according to Equation 2 or other time computation algorithm. The base stations 50 monitor the latency L between the time that the PDSN 22 transmits a GRE packet to the base station 50 and the frame transmission start time according to:

$$L = TCN(i) - TBS(i,s) \qquad \text{Eq. (4)}$$

If the packet latency L exceeds the upper bound $L_{upper}$, the base stations 50 drop selected GRE packets to prevent a buffer overflow. If the packet latency L is less than the lower bound, the base stations 50 pad the frames or send null frames to increase the packet latency. The base station 50 may also assign frames to another user. Each of these methods creates a gap in the transmission of broadcast frames to allow time for the buffer to fill. In either case, an automatic resynchronization process is triggered.

In the case of a buffer overflow, GRE packets are dropped from the end of the buffer until the anticipated latency is reduced to the minimum value greater than $T_{offset}$. If j denotes the GRE packet that triggers the buffer overflow (TBS(j,s)−TCN(j)>$L_{upper}$), the dropped GRE packets will be those that satisfy the conditions:

$$TBS(i,s) - TCN(i) \leq L_{upper} \qquad \text{Eq. (5)}$$

$$TBS(i,s) - TCN(j) > T_{offset} \qquad \text{Eq. (6)}$$

The first condition ensures that the packet triggering the automatic resynchronization process, i.e., GRE(j) is retained. The second condition selects all GRE packets preceding GRE(j) whose scheduled transmission start time exceeds their time stamp TCN(j) of GRE(j) by more than $T_{offset}$. The base station 50 recalculates the frame transmission start time for the initial frame of GRE(j). If k is the sequence number of the last GRE packet not dropped, the transmission start time for GRE(j) may be calculated according to:

$$TBS(j,s) = TBS(k,s) + \left\lfloor \frac{P(k,s) + N(k)}{S} \right\rfloor \times \Delta t \qquad \text{Eq. (7)}$$

The start position of GRE(j) in the initial frame may be calculated according to:

$$P(j,s) = (P(k,s) + N(k)) \bmod S \qquad \text{Eq. (8)}$$

GRE(j) will therefore be transmitted immediately after GRE(k).

Table 1 below illustrates one example of the automatic resynchronization process.

TABLE 1

Buffer Overflow Example

| i | T | TCN(i) | N(i) | P(i,s) | TBS(i,s) | L(i,s) | Buffer Fill Upper Bound |
|---|---|--------|------|--------|----------|--------|------------------------|
| 0 | 0 | 0 | 12384 | 0 | 800 | 800 | 12384 |
| 1 | 100 | 100 | 12384 | 864 | 980 | 880 | 24768 |

TABLE 1-continued

Buffer Overflow Example

| i | T | TCN(i) | N(i) | P(i,s) | TBS(i,s) | L(i,s) | | Buffer Fill Upper Bound |
|---|---|---|---|---|---|---|---|---|
| 2 | 110 | 110 | 320 | 448 | 1,180 | 1,070 | | 25088 |
| 3 | 200 | 200 | 12384 | 768 | 1,180 | 980 | | 37472 |
| 4 | 310 | 310 | 12384 | 352 | 1,380 | 1,070 | | 49856 |
| 5 | 380 | 380 | 12384 | 1,216 | 1,560 | 1,180 | | 62240 |
| 6 | 445 | 445 | 12392 | 800 | 1,760 | 1,315 | | 74632 |
| 7 | 500 | 500 | 9600 | 392 | 1,960 | 1,460 | | 84232 |
| 8 | 600 | 600 | 12384 | 1,032 | 2,100 | 1,500 | | 96616 |
| 9 | 700 | 700 | 12384 | 616 | 2,300 | 1,600 | DROPPED | 109000 |
| 10 | 750 | 750 | 12384 | 200 | 2,500 | 1,750 | PACKETS | 121384 |
| 11 | 800 | 800 | 12384 | 1,064 | 2,680 | 1,880 | | 133768 |
| 12 | 960 | 960 | 12384 | 648 | 2,880 | 1,920 | | 133768 |
| 13 | 1,100 | 1,200 | 4320 | 232 | 3,080 | 1,880 | | 125384 |
| 14 | 1,250 | 1,250 | 12112 | 712 | 3,140 | 1,890 | | 125112 |
| 15 | 1,400 | 1,400 | 12384 | 24 | 3,340 | 1,940 | | 137496 |
| | 1,400 | 1,400 | 12384 | 616 | 2,300 | 900 | RECOMPUTED VALUES | 71528 |

In the example shown in Table 1, the first packet is transmitted to the base station 50 at time 0 as indicated by the time stamp TCN(0) and is transmitted at time 800, which is equal to Toffset. The first GRE packet GRE(0), which contains 12384 bits, is put into the transmit buffer where it remains until the designated transmission time TBS(o,s) (which in this example equals 800). Note that the start position P(o,s) of GRE(0) equals 0 because the transmission of the first GRE packet coincides with the start of a frame. The second packet GRE(1) is received at time 100 and placed into the transmit buffer. The base station 50 computes the transmission start time TBS(1,s) of the frame containing the first bit of GRE(1) according to Equation 2. The second packet contains 12,384 user data bits, which require nine complete frames and 864 bits of a tenth frame to transmit. The number of complete frames is multiplied by the frame transmission time, which in this example is 20 ms, and the result is added to frame transmission start time TBS(o,s) for the frame containing the first bit of GRE(0) to get the frame transmission start time TBS(1,s ) for the frame containing the first bit of GRE(1). In this case, the frame transmission start time TBS(1,s ) is computed to be 980. The packet latency has increased to 880 and the buffer level has increased to 24,768 bits. After the 15th GRE packet, GRE (14), is delivered by the PDSN, the packet latency has increased to 1890 and the buffer level has increased to 125,112 bits. Upon receipt of the 16th GRE packet GRE (15), the packet latency L(15,s ) increases to 1940, which is greater than the maximum packet latency, $L_{upper}$ (set to 1900 in this example), triggering the automatic resynchronization process. The time stamp for the packet triggering the automatic resynchronization is 1400. Note that TBS(8,s )>TCN (15)+$T_{offset}$, whereas TBS(9,s )>TCN(15)+$T_{offset}$. Therefore, GRE(15) is transmitted immediately after GRE(8), and the intermediate packets GRE(9)-GRE(14) are selected for deletion from the buffer. Observe that the deleted packets satisfy Equations 5 and 6. After deletion of packets GRE(9)-GRE (14), the frame transmission start time TBS(15,s ), start position P(15,s ), and packet latency L(15,s ) for packet GRE(15) is recalculated based on TBS(8,s ), P(8,s ) and N(8). The recalculated synchronization parameters for GRE (15) are TBS(15,s )=616, P(15,s )=2300, which equal the corresponding parameters for GRE(9) since the calculation of these parameters is also based on TBS(8,s ), P(8,s ), and N(8), and L(15,s )=900.

In the case of a buffer underflow, the base stations 50 delay transmission of GRE packets and pad any intervening frames with dummy bits or fill bits. If j is the sequence number of a GRE packet that triggers an underflow condition, then the frame transmission start time TBS(j,s) and start position P(j,s) for GRE(j) are reset as follows:

$$TBS(j,s)=TCN(j)+T_{offset} \quad \text{Eq. (9)}$$

$$P(j,s)=0 \quad \text{Eq. (10)}$$

If TBS(j,s) is not a possible frame start time, then TBS(j,s) is rounded up to the next possible frame transmission start time. Queued GRE packets are mapped to air interface frames normally. When all GRE packets preceding GRE(j) have been transmitted, dummy bits are inserted into the transmitted air interface frames prior to TBS(j,s).

Table 2 below illustrates a buffer underflow condition.

TABLE 2

Buffer Underflow Example

| c | T | TCN(i) | N(i) | | P(i,s) | TBS(i,s) | L(I,s) | Buffer Fill Lower Bound |
|---|---|---|---|---|---|---|---|---|
| 0 | 0 | 0 | 1350 | 10800 | 0 | 800 | 800 | 0 |
| 1 | 200 | 200 | 1200 | 9600 | 560 | 960 | 760 | 0 |
| 2 | 400 | 400 | 1100 | 8800 | 1200 | 1,100 | 700 | 10800 |
| 3 | 500 | 500 | 680 | 5440 | 1040 | 1,240 | 740 | 10800 |

TABLE 2-continued

Buffer Underflow Example

| c | T | TCN(i) | N(i) | P(i,s) | TBS(i,s) | L(I,s) | | Buffer Fill Lower Bound |
|---|---|---|---|---|---|---|---|---|
| 4 | 600 | 600 | 760 | 6080 | 1040 | 1,340 | 740 | 20400 |
| 5 | 800 | 800 | 1200 | 9600 | 720 | 1,440 | 640 | 18400 |
| 6 | 1,000 | 1,000 | 1400 | 11200 | 80 | 1,600 | 600 | 20320 |
| 7 | 1,200 | 1000 | 1200 | 9600 | 1040 | 1,760 | 760 | 21120 |
| 8 | 1,400 | 1400 | 996 | 7968 | 400 | 1,920 | 520 | 20800 |
| 8 | 1,600 | 1600 | 880 | 7040 | 688 | 2,040 | 440 | 20800 |
| 9 | 1,800 | 1800 | 798 | 6384 | 48 | 2,160 | 360 | PAD | 7968 |
|  | 1,800 | 1800 | 798 | 6384 | 0 | 2,600 | 800 | RECOMPUTED | 7968 |
| 10 | 2,000 | 2000 | 1230 | 9840 | 1264 | 2,680 | 680 | VALUES | 7040 |
| 11 | 2,200 | 2200 | 1002 | 8016 | 864 | 2,840 | 640 | | 6384 |
| 12 | 2,400 | 2400 | 1548 | 12384 | 1200 | 2,960 | 560 | | 16224 |
| 13 | 2,600 | 2600 | 1440 | 11520 | 784 | 3,160 | 560 | | 24240 |

As shown in Table 2, the packet latency for GRE(9) drops below 400, which is the minimum threshold, $L_{lower}$. Packet GRE(9) contains a time stamp equal to 1800. The base station 50 recalculates the frame transmission start time for GRE(9) by adding $T_{offset}$ to the time stamp value to get a news frame transmission start time of 2600 which in this case coincides with the start of a frame. If the new frame transmission start time did no coincide with the beginning of a frame, the new frame transmission start time would be rounded up to the next possible frame transmission start time. The base station 50 sets the start position P(9,s) to zero because the first bit of GRE(9) will coincide with the first bit of the over-the-air frame.

The base station could also perform time synchronization based on a sequence number placed in the GRE packets by the PDSN 22 or BSN 24. To perform time synchronization based on a sequence number, the base stations 50 could negotiate a frame transmission start time TBS(i,s) for a packet with sequence number i using the broadcast parameter coordination process described above. The frame transmission start time and start position for subsequent GRE packets can then be computed according to Equations 2 and 3 above. Resynchronization could be periodically.

During mobile operation, it may be desirable to allow the base stations 50 to send layer 3 (L3) signaling messages to a mobile station 100 within the broadcast stream. For example, a base station 50 may desire to send a broadcast system parameters message or other overhead message to mobile station 100 listening to the broadcast channel. One approach to enable broadcasting of overhead messages on the broadcast channel is to temporarily drop those sectors in which the overhead message is broadcast from the soft handoff, and add the sectors back to the soft handoff after the signaling is complete. This approach is complex and requires coordination between the participating base stations 50 and the mobile station 100. For example, the time at which the soft handoff legs are dropped and added need to be coordinated between the base stations 50 and mobile station 100 receiving the broadcast stream. Such coordination requires signaling over the sidehaul links between participating base stations 50 and over-the-air signaling between the mobile station 100 and one or more of the participating base stations 50. The approach could lead to degradation in performance during those periods when the soft handoff legs are dropped. Because the duration of the signaling message is typically very short, this approach may not be desirable to network operators.

Another approach to enable signaling over the broadcast channel is to blank or delay frames scheduled for transmission to the mobile station 100 in all sectors involved in the soft handoff. The signaling message can be inserted into the frames that are made available by blanking or delaying frames carrying the broadcast stream. In this approach, the base station 50 that needs to send signaling or overhead messages on the broadcast channel sends a notification message to neighbor base stations. The notification message includes the time that it will begin transmission of the overhead message, the size of the overhead message, and the duration of the transmission of the overhead message. The notification message may be transmitted over the sidehaul links from the base station 50 initiating the signaling to its soft handoff neighbors. The message may include an action time field, length field, and optional message field. The action time field contains the time at which the initiating base station 50 will begin transmitting the signaling message on the broadcast channel. The length field indicates the length of the signaling message, which may be used by the other base stations 50 to determine the duration of the signaling message. The optional message field may contain the signaling message being transmitted to the mobile station 100. The notification message is used to resynchronize transmission of the broadcast stream following transmission of the overhead message to the mobile station.

When the initiating base station 50 provides the signaling message to its soft handoff neighbors, the soft handoff neighbors may be required to transmit the signaling message to the mobile station 100, allowing soft combining of the signaling message by the mobile station 100. If the signaling message is not provided by the initiating base station 50, the soft handoff neighbors must go into discontinuous transmission mode and stop transmission for the duration of the signaling message. When Reed Solomon coding is enabled, discontinuous transmission may not be used because the parity bits generated by the outer Reed Solomon code will not match resulting in the loss of an entire Reed Solomon block. To avoid this problem when Reed Solomon coding is enabled, the signal message carried over the broadcast channel needs to be transmitted in all sectors.

When the bandwidth of the broadcast channel is greater than necessary to support a broadcast stream, multiple broadcast streams may be multiplexed onto the same broadcast channel. To enable soft combining across BSC boundaries, the frames transmitted need to be identical in all sectors. If frames transmitted on the broadcast channel include data from multiple broadcast streams, a given base station 50 may need to subscribe to a broadcast streams that is not currently needed because all frames need to be identical to support soft combining.

The present invention provides support for multiplexed broadcast streams on the same broadcast channel without the need for base stations 50 to subscribe unnecessarily to a broadcast stream. The base station 50 may divide the broadcast channel into multiple time slots and identify the broadcast stream carried in each time slot. In this way, a mobile station 100 may soft combine those time slots carrying a broadcast stream of interest. Base station 50 participating in a soft handoff may negotiate which time slots to use for a given broadcast stream using the broadcast parameter coordination process as previously described. The remaining time slots may be used to transmit other broadcast streams, or the base station 50 may operate in a discontinuous transmission mode and stop transmitting during unused time slots. The base station 50 is not required to a broadcast stream that is not currently needed one of its sectors. Different base stations can transmit different broadcast streams in the same time slot as long as no mobile station is soft combining the time slots with the different streams. Thus, the multiplexed broadcast streams can be different in different sectors.

When multiplexing multiple broadcast streams in a frame on the broadcast channel, the bandwidth of the broadcast channel has to at least equal to the sum of the bandwidth required for the individual broadcast streams. The required bandwidth B for N broadcast streams is given by:

$$\sum_{i=1}^{N} B_i, \quad \text{Eq. (11)}$$

where $B_i \leq B$ and $B_i$ is expressed in kbs. Some broadcast streams may require an entire time slot, while other broadcast streams can be grouped into a single time slot. If some broadcast streams can be combined so that M<N time slots are required, Equation 11 can be rewritten as:

$$\sum_{i=1}^{M} B_i, \quad \text{Eq. (12)}$$

In one embodiment of the invention, the time slots are 20 ms. Given that frame sizes on the BCH are typically multiples of 20 ms, each frame on the BCH can be evenly divided into 20 ms time slots. Let T denote the time period during which all broadcast streams are served so as to satisfy the bandwidth requirement for each broadcast stream. T can be expressed as the number of 20 msec time slots. The value of T determines the periodicity with which each broadcast stream will be serviced and the buffer size needed to support the multiplexed broadcast streams.

The challenge is to determine the minimum time period T needed to optimally serve all multiplexed broadcast streams. The minimum broadcast interval T can be computed according to:

$$T_{MIN} = \sum_{i=1}^{M} \frac{B_i}{GCF} \quad \text{Eq. (13)}$$

In Equation 13, the bandwidth $B_i$ for each broadcast stream is divided by the greatest common factor GCF for all broadcast streams and the results are summed to get the minimum broadcast interval $T_{MIN}$. In this computation, two or more broadcast streams sharing the same time slot are treated as a single broadcast stream. By minimizing the broadcast interval, the size of the dejitter buffer at the mobile station is minimized.

As one example, assume that a base station 50 is multiplexing three broadcast streams onto the BCH with data rates of 10 kbs, 12 kbs, and 20 kbs respectively. The greatest common factor for these three broadcast streams is 2000. Therefore, the minimum broadcast interval $T_{MIN}$ can be computed as follows:

$$T_{MIN} = \sum \frac{10,000}{2,000} + \frac{12,000}{2,000} + \frac{20,000}{2,000} \quad \text{Eq. (14)}$$

$$T_{MIN} = \sum 5 + 6 + 10$$

$$T_{MIN} = 21$$

In this example, the broadcast interval $T_{MIN}$ is equal to 21 frames. The value of $T_{MIN}$, along with the slot allocation and the starting point for the broadcast interval needs to be communicated to the other base stations 50 participating in a soft handoff.

In any case, those skilled in the art should appreciate that the present invention is not limited by the foregoing discussion, nor by the accompanying figures. Rather, the present invention is limited only by the following claims, and their reasonable legal equivalents.

What is claimed is:

1. A method of coordinating broadcast parameters between base stations to facilitate autonomous soft handoff by a mobile station, the method comprising:
   detecting a broadcast parameter coordination event,
   negotiating, responsive to said broadcast parameter coordination event, with one or more neighbor base stations over a sidehaul link to determine a set of common broadcast parameter settings and a set of soft handoff sectors for a designated broadcast stream, comprising
       sending a broadcast parameter coordination request message over a sidehaul link to one or more neighbor base stations;
       receiving a broadcast parameter coordination response message from one or more of the neighbor base stations over said sidehaul link, said broadcast parameter coordination response message from each neighbor base station containing a sector list identifying sectors that the neighbor base station will commit to a soft handoff for the designated broadcast stream;
       determining negotiated broadcast parameter settings and soft handoff sectors based on said broadcast parameter coordination response messages from the neighbor base stations; and sending a broadcast parameter commit message from a first base station to one or more of the neighbor base stations over the sidehaul link, the broadcast parameter commit message containing the negotiated set of common broadcast parameter settings and a sector list identifying the soft handoff sectors committed to a soft handoff using the common set of broadcast parameter settings.

2. The method of claim 1 wherein the broadcast parameter coordination request message includes a sector list identifying sectors that the first base station will commit to include a soft handoff.

3. The method of claim 1 wherein said broadcast parameter coordination response message includes proposed broadcast parameter settings for a designated broadcast stream.

4. The method of claim 3 wherein said broadcast parameter coordination response message from each neighbor base station contains an alternate set of broadcast parameter settings if the neighbor base station is unable to commit to the proposed broadcast parameter settings contained in the broadcast parameter coordination request message.

5. The method of claim 1 wherein the first base station selects the common set of broadcast parameter settings based on the on said broadcast parameter coordination response messages from the neighbor base stations.

6. The method of claim 1 wherein negotiating a set of common broadcast parameter settings and a set of soft handoff sectors committed to a soft handoff for a designated broadcast stream comprises:
receiving a broadcast parameter coordination request message over a sidehaul link at a first base station from a second base station;
sending a broadcast parameter coordination response message over said sidehaul link to said first base station, said broadcast parameter coordination response message containing a sector list identifying sectors that the first base station will commit to a soft handoff for the designated broadcast stream; and
receiving a broadcast parameter commit message from the second base station, the broadcast parameter commit message containing the negotiated common set of broadcast parameter settings and a sector list identifying soft handoff sectors committed to a soft handoff using the common set of broadcast parameter settings.

7. The method of claim 6 wherein the broadcast parameter coordination request message includes a sector list identifying sectors that the first base station will commit to a soft handoff.

8. The method of claim 6 wherein the broadcast parameter request message includes proposed broadcast parameter settings for a designated broadcast stream.

9. The method of claim 8 wherein the broadcast parameter response message contains an alternate set of broadcast parameter settings if the first base station is unable to commit to the proposed broadcast parameter settings in the broadcast parameter coordination request message.

10. The method of claim 1 wherein negotiating a set of common broadcast parameter settings and a set of soft handoff sectors committed to a soft handoff for a designated broadcast stream comprises:
sending from a first base station a broadcast parameter coordination request message over a sidehaul link to a designated master base station that determines the common set of broadcast parameter settings for a group of sectors in a soft handoff region,
receiving at the first base station a broadcast parameter coordination response message from the master base station over said sidehaul link, said broadcast parameter coordination response message containing the common set of broadcast parameter settings for the designated broadcast stream; and
sending a broadcast parameter commit message from the first base station to the master base station over the sidehaul link, the broadcast parameter commit message including a sector list identifying sectors committed by the first base station to the soft handoff using the common set of broadcast parameter settings.

11. The method of claim 10 wherein the broadcast parameter coordination request message includes proposed broadcast parameter settings for a designated broadcast stream.

12. The method of claim 10 wherein the broadcast parameter coordination request message includes a list of sectors that the first base station will commit to a soft handoff for the designated broadcast stream.

13. The method of claim 10 wherein the broadcast parameter commit message includes an action time indicating when the common set of broadcast parameters will be effective.

14. The method of claim 10 wherein the broadcast parameter coordination response message includes a sector list identifying one or more sectors committed to a soft handoff for the designated broadcast stream.

15. The method of claim 1 wherein negotiating a set of common broadcast parameter settings and a set of soft handoff sectors committed to a soft handoff for a designated broadcast stream comprises:
receiving at a master base station a broadcast parameter coordination request message over a sidehaul link from a first base station,
determining broadcast parameters for the designated broadcast stream at the master base station;
sending a broadcast parameter coordination response message from the master base stations over said sidehaul link to said first base station, said broadcast parameter coordination response message containing the common set of broadcast parameter settings for the designated broadcast stream; and
receiving at the master base station a broadcast parameter commit message over the sidehaul link from the first base station to commit one or more sectors of the first base station to a soft handoff using the common set of broadcast parameter settings.

16. The method of claim 15 wherein the broadcast parameter coordination request message includes a list of sectors that the first base station will commit to a soft handoff for the designated broadcast stream.

17. The method of claim 16 wherein the broadcast parameter coordination request message includes proposed broadcast parameter settings for a designated broadcast stream.

18. The method of claim 17 wherein the master base station determines the common set of broadcast parameter settings based on the proposed broadcast parameter settings in the broadcast parameter coordination request message.

19. The method of claim 15 wherein the broadcast parameter coordination response message includes a sector list identifying one or more sectors committed to a soft handoff for the designated broadcast stream.

20. The method of claim 15 wherein the broadcast parameter coordination response message includes an action time indicating when the broadcast parameters will be effective.

21. A base station including a base station controller configured to support autonomous soft handoff by a mobile station receiving a broadcast stream, the base station controller configured to:
- detect a broadcast parameter coordination event,
- negotiate, responsive to said broadcast parameter coordination event, with one or more neighbor base stations over a sidehaul link to determine a set of common broadcast parameter settings and a set of soft handoff sectors for a designated broadcast stream, by:
  - sending a broadcast parameter coordination request message over a sidehaul link to one or more neighbor base stations;
  - receiving a broadcast parameter coordination response message from one or more of the neighbor base stations over said sidehaul link, said broadcast parameter coordination response message from each neighbor base station containing a sector list identifying sectors that the neighbor base station will commit to a soft handoff for the designated broadcast stream;
  - determining the common set of broadcast parameter settings and soft handoff sectors based on said broadcast parameter coordination response messages from the neighbor base stations; and
  - sending a broadcast parameter commit message to one or more of the neighbor base stations over the sidehaul link, the broadcast parameter commit message containing the negotiated set of common broadcast parameter settings and a sector list identifying the soft handoff sectors committed to the soft handoff using the common set of broadcast parameter settings.

22. The method of claim 21 wherein the broadcast parameter coordination request message includes a sector list identifying sectors that the first base station will commit to the soft handoff.

23. The base station of claim 21 wherein said broadcast parameter coordination request message includes proposed broadcast parameter settings for a designated broadcast stream.

24. The base station of claim 23 wherein said broadcast parameter coordination response message from each neighbor base station contains an alternate set of broadcast parameter settings if the neighbor base station is unable to commit to the proposed broadcast parameter settings contained in the broadcast parameter coordination request message.

25. The base station of claim 21 wherein the base station selects the common set of broadcast parameter settings based on the on said broadcast parameter coordination response messages from the neighbor base stations.

26. A base station including a base station controller configured to support autonomous soft handoff by a mobile station receiving a broadcast stream, the base station controller configured to:
- detect a broadcast parameter coordination event,
- negotiate, responsive to said broadcast parameter coordination event, with one or more neighbor base stations over a sidehaul link to determine a set of common broadcast parameter settings and a set of soft handoff sectors for a designated broadcast stream by:
  - receiving a broadcast parameter coordination request message over a sidehaul link from a neighbor base station;
  - sending a broadcast parameter coordination response message to the neighbor base station over said sidehaul link, said broadcast parameter coordination response message including a sector list identifying sectors that the base station will commit to a soft handoff; and
  - receiving a broadcast parameter commit message from the neighbor base over the sidehaul link, the broadcast parameter commit message including the negotiated common set of broadcast parameter settings and a sector list indicating the soft handoff sectors committed to the soft handoff using the common set of broadcast parameter settings.

27. The base station of claim 26 wherein the broadcast parameter coordination request message includes a sector list identifying sectors that the base station will commit to a soft handoff for a designated broadcast stream.

28. The base station of claim 26 wherein the broadcast parameter coordination request message includes proposed broadcast parameter settings for a designated broadcast stream.

29. The base station of claim 28 wherein the broadcast parameter coordination response message includes an alternate set of broadcast parameter settings if the base station is unable to commit to the proposed broadcast parameter settings contained in the broadcast parameter coordination request message.

30. A base station including a base station controller configured to support autonomous soft handoff by a mobile station receiving a broadcast stream, the base station controller configured to:
- detect a broadcast parameter coordination event,
- negotiate, responsive to said broadcast parameter coordination event, with one or more neighbor base stations over a sidehaul link to determine a set of common broadcast parameter settings and a set of soft handoff sectors for a designated broadcast stream by:
  - sending a broadcast parameter coordination request message over a sidehaul link to a designated master base station that determines the common set of broadcast parameter settings for a group of sectors in a soft handoff region,
  - receiving a broadcast parameter coordination response message from the master base station over said sidehaul link, said broadcast parameter coordination response message containing the common set of broadcast parameter settings for the designated broadcast stream; and
  - sending a broadcast parameter commit message to the master base station over the sidehaul link to commit one or more sectors to the soft handoff.

31. The base station of claim 30 wherein the broadcast parameter coordination request message includes proposed broadcast parameter settings for the designated broadcast stream.

32. The base station of claim 30 wherein the broadcast parameter coordination request message includes a list of sectors that the first base station will commit to a soft handoff for the designated broadcast stream.

33. The base station of claim 30 wherein the broadcast parameter coordination response message includes an action time indicating when the common set of broadcast parameters will be effective.

34. The base station of claim 30 wherein the broadcast parameter coordination response message includes a sector list identifying one or more sectors committed to the soft handoff using the common set of broadcast parameters.

35. The base station of claim 30 wherein the broadcast parameter commit message includes a sector list identifying sectors committed by the first base station to the soft handoff using the common set of broadcast parameter settings.

36. A base station including a base station controller configured to support autonomous soft handoff by a mobile station receiving a broadcast stream, the base station controller configured to:
   detect a broadcast parameter coordination event,
   negotiate, responsive to said broadcast parameter coordination event, with one or more neighbor base stations over a sidehaul link to determine a set of common broadcast parameter settings and a set of soft handoff sectors for a designated broadcast stream by:
      receiving a broadcast parameter coordination request message over a sidehaul link from a first base station,
      determining broadcast parameters for the designated broadcast stream;
      sending a broadcast parameter coordination response message over said sidehaul link to said first base station, said broadcast parameter coordination response message containing the common set of broadcast parameter settings for the designated broadcast stream; and
      receiving a broadcast parameter commit message over the sidehaul link from the first base station committing one or more sectors of the first base station to a soft handoff using the common set of broadcast parameter settings.

37. The base station of claim 36 wherein the broadcast parameter coordination request message includes a list of sectors that the first base station will commit to a soft handoff for the designated broadcast stream.

38. The base station of claim 36 wherein the broadcast parameter coordination request message includes proposed broadcast parameter settings for the designated broadcast stream.

39. The base station of claim 38 wherein the base station controller determines the set of common broadcast parameter settings and soft handoff sectors based on the proposed broadcast parameter settings in the broadcast parameter coordination request message.

40. The base station of claim 36 wherein the broadcast parameter coordination response message includes an action time indicating when the broadcast parameters will be effective.

41. The base station claim 36 wherein the broadcast parameter coordination commit message includes a sector list identifying sectors that the first base station commits to the soft handoff.

42. The base station of claim 36 wherein the broadcast parameter coordination response message includes a sector list identifying one or more soft handoff sectors committed to the soft handoff for the designated broadcast stream.

* * * * *

UNITED STATES PATENT AND TRADEMARK OFFICE
CERTIFICATE OF CORRECTION

PATENT NO. : 7,346,352 B2
APPLICATION NO. : 10/982152
DATED : March 18, 2008
INVENTOR(S) : Colban et al.

It is certified that error appears in the above-identified patent and that said Letters Patent is hereby corrected as shown below:

In Table 1 at Col. 17, please add the highlighted bold lines around the Dropped Packets:

Table 1 below illustrates one example of the automatic resynchronization process.

| i | T | TCN(i) | N(i) | P(i,s) | TBS(i,s) | L(i,s) | | Buffer Fill Upper Bound |
|---|---|---|---|---|---|---|---|---|
| 0 | 0 | 0 | 12384 | 0 | 800 | 800 | | 12384 |
| 1 | 100 | 100 | 12384 | 864 | 980 | 880 | | 24768 |
| 2 | 110 | 110 | 320 | 448 | 1,180 | 1,070 | | 25088 |
| 3 | 200 | 200 | 12384 | 768 | 1,180 | 980 | | 37472 |
| 4 | 310 | 310 | 12384 | 352 | 1,380 | 1,070 | | 49856 |
| 5 | 380 | 380 | 12384 | 1,216 | 1,560 | 1,180 | | 62240 |
| 6 | 445 | 445 | 12392 | 800 | 1,760 | 1,315 | | 74632 |
| 7 | 500 | 500 | 9600 | 392 | 1,960 | 1,460 | | 84232 |
| 8 | 600 | 600 | 12384 | 1,032 | 2,100 | 1,500 | | 96616 |
| 9 | 700 | 700 | 12384 | 616 | 2,300 | 1,600 | DROPPED PACKETS | 109000 |
| 10 | 750 | 750 | 12384 | 200 | 2,500 | 1,750 | | 121384 |
| 11 | 800 | 800 | 12384 | 1,064 | 2,680 | 1,880 | | 133768 |
| 12 | 960 | 960 | 12384 | 648 | 2,880 | 1,920 | | 133768 |
| 13 | 1,100 | 1,200 | 4320 | 232 | 3,080 | 1,880 | | 125384 |
| 14 | 1,250 | 1,250 | 12112 | 712 | 3,140 | 1,890 | | 125112 |
| 15 | 1,400 | 1,400 | 12384 | 24 | 3,340 | 1,940 | | 137496 |
| | 1,400 | 1,400 | 12384 | 616 | 2,300 | 900 | RECOMPUTED VALUES | 71528 |

Page 1 of 2

UNITED STATES PATENT AND TRADEMARK OFFICE
CERTIFICATE OF CORRECTION

PATENT NO. : 7,346,352 B2  
APPLICATION NO. : 10/982152  
DATED : March 18, 2008  
INVENTOR(S) : Colban et al.

It is certified that error appears in the above-identified patent and that said Letters Patent is hereby corrected as shown below:

In Table 2 at Col. 19, please add the highlighted bold lines around the Recomputed Values:

Table 2 below illustrates a buffer underflow condition.

| Table 2 – Buffer Underflow Example | | | | | | | | | |
|---|---|---|---|---|---|---|---|---|---|
| c | T | TCN(i) | N(i) | | P(i,s) | TBS(i,s) | L(i,s) | | Buffer Fill Lower Bound |
| 0 | 0 | 0 | 1350 | 10800 | 0 | 800 | 800 | | 0 |
| 1 | 200 | 200 | 1200 | 9600 | 560 | 960 | 760 | | 0 |
| 2 | 400 | 400 | 1100 | 8800 | 1200 | 1,100 | 700 | | 10800 |
| 3 | 500 | 500 | 680 | 5440 | 1040 | 1,240 | 740 | | 10800 |
| 4 | 600 | 600 | 760 | 6080 | 1040 | 1,340 | 740 | | 20400 |
| 5 | 800 | 800 | 1200 | 9600 | 720 | 1,440 | 640 | | 18400 |
| 6 | 1,000 | 1,000 | 1400 | 11200 | 80 | 1,600 | 600 | | 20320 |
| 7 | 1,200 | 1000 | 1200 | 9600 | 1040 | 1,760 | 760 | | 21120 |
| 8 | 1,400 | 1400 | 996 | 7968 | 400 | 1,920 | 520 | | 20800 |
| 8 | 1,600 | 1600 | 880 | 7040 | 688 | 2,040 | 440 | | 20800 |
| 9 | 1,800 | 1800 | 798 | 6384 | 48 | 2,160 | 360 | PAD | 7968 |
| | 1,800 | 1800 | 798 | 6384 | 0 | 2,600 | 800 | RECOMPUTED VALUES | 7968 |
| 10 | 2,000 | 2000 | 1230 | 9840 | 1264 | 2,680 | 680 | | 7040 |
| 11 | 2,200 | 2200 | 1002 | 8016 | 864 | 2,840 | 640 | | 6384 |
| 12 | 2,400 | 2400 | 1548 | 12384 | 1200 | 2,960 | 560 | | 16224 |
| 13 | 2,600 | 2600 | 1440 | 11520 | 784 | 3,160 | 560 | | 24240 |

Signed and Sealed this

First Day of July, 2008

JON W. DUDAS  
*Director of the United States Patent and Trademark Office*